US010487209B2

(12) United States Patent
Naidoo et al.

(10) Patent No.: US 10,487,209 B2
(45) Date of Patent: *Nov. 26, 2019

(54) MICRONIZED ASPHALT MODIFIERS, METHODS OF MODIFYING ASPHALT, ASPHALT COMPOSITIONS AND METHODS OF MAKING

(71) Applicant: LEHIGH TECHNOLOGIES, INC., Tucker, GA (US)

(72) Inventors: Premnathan Naidoo, Pass Chastain, MS (US); Vernon Patrick Keating, Fredericksburg, TX (US)

(73) Assignee: Lehigh Technologies, Inc., Tucker, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/899,345

(22) Filed: Feb. 19, 2018

(65) Prior Publication Data

US 2019/0169437 A1  Jun. 6, 2019

Related U.S. Application Data

(63) Continuation of application No. 14/304,966, filed on Jun. 15, 2014, now Pat. No. 9,896,582, which is a continuation-in-part of application No. 13/311,445, filed on Dec. 5, 2011, now Pat. No. 8,784,554, which is a continuation-in-part of application No. 12/399,960, filed on Mar. 8, 2009, now abandoned.

(51) Int. Cl.
*C08L 95/00* (2006.01)
*C09D 195/00* (2006.01)
*C08L 23/10* (2006.01)
*C08L 9/06* (2006.01)
*C08F 110/00* (2006.01)
*C08L 23/00* (2006.01)
*C08L 53/00* (2006.01)
*C08L 55/00* (2006.01)
*C08L 91/00* (2006.01)

(52) U.S. Cl.
CPC .............. *C08L 95/00* (2013.01); *C08L 9/06* (2013.01); *C08L 23/10* (2013.01); *C09D 195/00* (2013.01); *C08F 110/00* (2013.01); *C08K 2201/003* (2013.01); *C08L 23/00* (2013.01); *C08L 53/00* (2013.01); *C08L 55/00* (2013.01); *C08L 91/00* (2013.01); *C08L 2205/03* (2013.01); *C08L 2205/035* (2013.01); *C08L 2555/86* (2013.01); *Y02A 30/333* (2018.01)

(58) Field of Classification Search
CPC ...................................................... C08L 95/00
See application file for complete search history.

(56) References Cited

U.S. PATENT DOCUMENTS

| | | |
|---|---|---|
| 3,689,597 A | 9/1972 | Mahlman |
| 3,853,800 A | 12/1974 | Haberl |
| 3,887,422 A | 6/1975 | Bosniack |
| 3,896,069 A | 7/1975 | Kosaka et al. |
| 4,267,085 A | 5/1981 | Katoh et al. |
| 4,340,517 A | 7/1982 | Aldred et al. |
| 4,418,167 A | 11/1983 | Bohm et al. |
| 4,419,469 A | 12/1983 | Bohm |
| 4,420,524 A | 12/1983 | Gorgati |
| 4,560,414 A | 12/1985 | Kikegawa et al. |
| 4,618,521 A | 10/1986 | Ruehl et al. |
| 4,621,108 A | 11/1986 | Burris |
| 4,738,998 A | 4/1988 | Uffner et al. |
| 4,973,615 A | 11/1990 | Futamura |
| 4,978,698 A | 12/1990 | Woodhams |
| 4,992,492 A | 2/1991 | Sainton |
| 5,221,703 A | 6/1993 | Ostermeyer |
| 5,252,641 A | 10/1993 | Dawans |
| 5,280,064 A | 1/1994 | Hesp et al. |
| 5,308,898 A | 5/1994 | Dawans |
| 5,380,773 A | 1/1995 | Bellio et al. |
| 5,397,843 A | 3/1995 | Lakshmanan |
| 5,451,619 A | 9/1995 | Kluttz |
| 5,482,982 A | 1/1996 | Lakshmanan |
| 5,558,703 A | 9/1996 | Bredael |
| 5,704,971 A | 1/1998 | Memon |
| 5,708,062 A | 1/1998 | Maillet et al. |
| 5,712,033 A | 1/1998 | Gallagher et al. |
| 5,719,215 A | 2/1998 | Liang et al. |
| 5,827,008 A | 10/1998 | Smith et al. |
| 5,952,412 A | 9/1999 | Greenberg et al. |
| 5,990,203 A | 11/1999 | Cheng |
| 6,000,877 A | 12/1999 | Fishback et al. |
| 6,020,404 A | 2/2000 | Planche |
| 6,100,317 A | 8/2000 | Liang et al. |
| 6,133,350 A | 10/2000 | Kluttz |
| 6,214,908 B1 | 4/2001 | Lem et al. |
| 6,284,820 B1 | 9/2001 | Braga et al. |
| 6,384,112 B1 | 5/2002 | Boussad |
| 6,414,066 B1 | 7/2002 | Lem et al. |

(Continued)

FOREIGN PATENT DOCUMENTS

WO   WO 2012/049650 A1   4/2012

*Primary Examiner* — Liam J Heincer

(74) *Attorney, Agent, or Firm* — Dority & Manning, P.A.

(57) ABSTRACT

An asphalt additive comprising a primary rheology modifying component and a secondary rheology modifying component, and asphalt compositions and products having such additive incorporated therein. The primary rheology modifying component is generally a polymer, and the secondary rheology modifying component may comprise a petroleum micro-wax.

17 Claims, 7 Drawing Sheets

(56) References Cited

U.S. PATENT DOCUMENTS

| | | |
|---|---|---|
| 6,444,731 B1 | 9/2002 | Memon |
| 6,478,951 B1 | 11/2002 | Labib |
| 6,583,202 B1 | 6/2003 | Grube et al. |
| 6,588,974 B2 | 7/2003 | Hildebrand et al. |
| 6,844,381 B2 | 1/2005 | Kelly et al. |
| 6,884,831 B1 | 4/2005 | Memon |
| 7,371,794 B2 | 5/2008 | Memon |
| 7,569,627 B2 | 8/2009 | Dean |
| RE41,167 E | 3/2010 | Stuart et al. |
| 7,829,636 B2 | 11/2010 | Shaghaghi et al. |
| RE42,165 E | 2/2011 | Stuart et al. |
| 8,017,675 B2 | 9/2011 | Macome et al. |
| 8,034,172 B2 | 10/2011 | Naidoo et al. |
| 8,173,725 B2 | 5/2012 | Choen et al. |
| 8,404,037 B2 | 3/2013 | Naidoo et al. |
| 8,440,011 B2 | 5/2013 | Naidoo et al. |
| 8,784,554 B2 | 7/2014 | Naidoo |
| 9,896,582 B2 * | 2/2018 | Naidoo ............ C09D 195/00 |
| 2002/0052432 A1 | 5/2002 | Lemoine et al. |
| 2002/0055561 A1 | 5/2002 | Haveaux et al. |
| 2003/0065063 A1 | 4/2003 | Kim |
| 2003/0087997 A1 | 5/2003 | Shatz |
| 2003/0187104 A1 | 10/2003 | Guilbault |
| 2004/0102547 A1 | 5/2004 | Cowley et al. |
| 2004/0198874 A1 | 10/2004 | Prejean |
| 2004/0225036 A1 | 11/2004 | Sylvester |
| 2004/0249025 A1 | 12/2004 | Dean |
| 2005/0101701 A1 | 5/2005 | Stuart et al. |
| 2005/0101702 A1 | 5/2005 | Stuart et al. |
| 2005/0124741 A1 | 6/2005 | Chen |
| 2005/0145136 A1 | 7/2005 | Butler et al. |
| 2005/0187317 A1 | 8/2005 | Cowley et al. |
| 2005/0241529 A1 | 11/2005 | Partanen et al. |
| 2006/0089428 A1 | 4/2006 | Hakata et al. |
| 2006/0100321 A1 | 5/2006 | Orange |
| 2006/0223916 A1 | 10/2006 | Stuart et al. |
| 2006/0250886 A1 | 11/2006 | Dupuis |
| 2006/0293420 A1 | 12/2006 | Prejean et al. |
| 2007/0027261 A1 | 2/2007 | Prejean et al. |
| 2007/0054987 A1 | 3/2007 | Zanchetta et al. |
| 2007/0054988 A1 | 3/2007 | Zanchetta et al. |
| 2007/0185246 A1 | 8/2007 | Fujitani et al. |
| 2007/0199476 A1 | 8/2007 | Bobee et al. |
| 2007/0251416 A1 | 11/2007 | Dean et al. |
| 2007/0254989 A1 | 11/2007 | Zanchetta et al. |
| 2008/0015288 A1 | 1/2008 | Antoine |
| 2008/0073849 A1 | 3/2008 | Quinn et al. |
| 2008/0115444 A1 | 5/2008 | Kalkanoglu |
| 2008/0153945 A1 | 6/2008 | Prejean et al. |
| 2008/0161451 A1 | 7/2008 | Lommerts et al. |
| 2008/0200611 A1 | 8/2008 | Prejean et al. |
| 2008/0255277 A1 | 10/2008 | Bobee et al. |
| 2009/0000515 A1 | 1/2009 | Trumbore et al. |
| 2009/0004387 A1 | 1/2009 | Trumbore et al. |
| 2009/0012214 A1 | 1/2009 | Butler et al. |
| 2009/0054561 A1 | 2/2009 | Barnat |
| 2009/0054562 A1 | 2/2009 | Martin |
| 2009/0061236 A1 | 3/2009 | Walther et al. |
| 2009/0068348 A1 | 3/2009 | Reinke et al. |
| 2009/0084287 A1 | 4/2009 | Partanen et al. |
| 2010/0048771 A1 | 2/2010 | Osborn |
| 2010/0147190 A1 | 6/2010 | Naidoo et al. |
| 2010/0168274 A1 | 7/2010 | Coe |
| 2010/0227954 A1 | 9/2010 | Naidoo et al. |
| 2010/0273915 A1 | 10/2010 | Choen et al. |
| 2010/0319577 A1 | 12/2010 | Naidoo et al. |
| 2010/0331459 A1 | 12/2010 | MacOme et al. |
| 2011/0015312 A1 | 1/2011 | Laurens |
| 2011/0017096 A1 | 1/2011 | Reinke et al. |
| 2011/0020537 A1 | 1/2011 | Reinke et al. |
| 2011/0021673 A1 | 1/2011 | Reinke et al. |
| 2011/0082240 A1 | 4/2011 | Crews |
| 2011/0160356 A1 | 6/2011 | Martin |
| 2011/0184090 A1 | 7/2011 | De Jonge |
| 2011/0214796 A1 | 9/2011 | Avramidis et al. |
| 2011/0243661 A1 | 10/2011 | Baumgardner et al. |
| 2011/0257308 A1 | 10/2011 | Italia et al. |
| 2011/0269876 A1 | 11/2011 | Rowe et al. |
| 2012/0225979 A1 | 9/2012 | Naidoo et al. |
| 2012/0252939 A1 | 10/2012 | Hacker |
| 2013/0074729 A1 | 3/2013 | Reinke et al. |
| 2013/0116364 A1 | 5/2013 | Butz et al. |
| 2013/0289172 A1 | 10/2013 | Avramidis et al. |
| 2015/0105495 A1 | 4/2015 | Naidoo |
| 2015/0105496 A1 | 4/2015 | Naidoo |
| 2015/0112001 A1 | 4/2015 | Naidoo |

* cited by examiner

FIG. 1

TABLE 7. Separation Test Results for Test Highway using Rheopave 10XP and 8.5% Ground Tire Rubber

| REPORT ON SAMPLE(S) OF PERFORMANCE GRADED BINDER SFMC TK13 76-22 ARB @ 67C* | MSCR1 | MSCR2 | Average |
|---|---|---|---|
| Average % recovery at 0.1 kPa | 63.18 | 61.37 | 62 |
| Average % recovery at 3.2 kPa | 51.96 | 52.65 | 52 |
| % difference between average % recovery at 0.1 kPa and 3.2 kPa | 17.76 | 14.22 | 16 |
| Jnr at 0.1 kPa | 0.20 | 0.21 | 0.2 |
| Jnr at 3.2 kPa | 0.28 | 0.27 | 0.3 |
| % difference in Jnr between 0.1 kPa and 3.2 kPa | 36.42 | 26.83 | 32 |

*2 mm gap

Cigar Tube Separation Results
Top: 66.5 C
Bottom: 66.0 C

FIG. 2   TABLE 9   PG67-22 Base Asphalt Upgraded to PG76-22 GTR with MSCR Spec.

| PROPERTY | 9.00% GTR FORMULA USING RHEOPAVE ADDITIVE | TARGET | |
|---|---|---|---|
| RV @ 135°C (cP) | 2850 | Max. 3000 | Multiple Stress Creep Recovery MSCR Specification of > 50% is achieved with Rheopave 10XP and 9 % Ground Tire Rubber. |
| Original DSR @ 76°C: | | | |
| Phase Angle (°) | 71.6 | < 75.0 | |
| G*/Sin(δ) (kPa) | 1.970 | Min. 1.0 | |
| Fail Temp. (°C) | 83.4 | Min. 76 | |
| RTFO DSR @ 76°C: | | | |
| Phase Angle (°) | 63.5 | - | |
| G*/Sin(δ) (kPa) | 4.830 | Min. 2.2 | |
| Fail Temp. (°C) | 85.1 | Min. 76 | |
| PAV DSR @ 25°C: | | | |
| Phase Angle (°) | 44.1 | - | |
| G*xSin(δ) (kPa) | 2660 | Max. 5000 | |
| MSCR @ 64C [Jnr / % Rec] | 0.208 / 62.98% | % Rec > 50.0% | |
| BBR @ -12°C: | | | |
| Tm-value (MPa) | 0.334 | Min. 0.300 | |
| Stiffness (MPa) | 152 | Max. 300 | |
| BBR @ -18°C: | | | |
| m-value (MPa) | 0.283 | Min. 0.300 | |
| Stiffness (MPa) | 273 | Max. 300 | |
| Continuous PG: | 83.4 – 26.0 | 76-22 | |
| PG Grade: | 82 - 22 | 76-22 | |

FIG. 3     TABLE 11

Contractor:  
Binder: SFMC  
Location:  
LOT: 3  
Sublot: 1

Roadway: 43280000  
Tonnage: 448 tons  
County:  
Type Mix: SP-12.5  
Lift:

FIN:  
Design:  
Details:  
Thickness: 1"

427020-1 (E4N35)

NO TRANSFER TO LD

| Samples | AV | AC | Lab Gmb | Gmm | Field Density (92%) | | | | | |
|---|---|---|---|---|---|---|---|---|---|---|
| | | | | | Core 1 | Core 2 | Core 3 | Core 4 | Core 5 | Sublot 1 |
| | | 6.50 | 2.274 | 2.369 | | | | | | |
| QC 1 | 4.18 | 6.60 | 2.271 | 2.370 | 2.183 | 2.196 | 2.17 | 2.126 | | 91.52 |
| VT 1 | 3.90 | 6.43 | 2.269 | 2.361 | 2.176 | 2.188 | 2.16 | 2.117 | | 91.49 |
| IV 1 | 4.24 | 6.47 | 2.259 | 2.359 | 2.202 | 2.148 | 2.206 | 2.142 | | 92.20 |
| PC (S) | 4.14 | 6.55 | 2.267 | 2.365 | | | | | | |
| Project Ave | 4.00 | 6.42 | 2.276 | 2.371 | 2.187 | | | | | 92.26 |

| | P-8 | P-200 | Pb | Va | %Gmm | Binder passed all requirements for PG 76-22 (ARB) |
|---|---|---|---|---|---|---|
| PF | 1.00 | 1.05 | 1.05 | 1.05 | 1.05 | |
| CPF | 1.05 | | | | | |

FIG. 4A

TABLE 12 (Part 1)

| Florida Superpave PG+ Binder Specification Tests | | | |
|---|---|---|---|
| Material Supplier | | | |
| Supplier Sample ID | | | TK13 76-22 ARB |
| Supervisor | RD | | |
| Date Tested | 05/11/2013 | | |
| QPL | S916-0215 | | |
| Florida DOT PG+ Grade | | | PG 76-22 |
| AASHTO M320 Continuous PG Grade | | | PG 84.32-27.10 |
| DLSI Internal ID | | | SFMC TK13 76-22 ARB |
| | AASHTO Std. | AASHTO Limits | |
| Un-aged Org. Binder Tests: | | | |
| Flash Point, °C | T 48 | 232.22 °C min. | 307 |
| Viscosity-Rotational, Pa-s 135 C | T 316 | 3.0 max. | 3.630 |
| Cigar Cubes Separation at 183C 48 hours | | | |
| Softening Point, Top | T53 | 15F max dif. | 136.58 |
| Softening Point, Bottom | T53 | | 144.86 |
| Dynamic Shear Rheometer | | T 315 | |
| Passing Temperature, °C | | | 76 |
| Phase Angle, degrees | | 75° max. | 70.4 |
| G° @ 10 rad/sec, kPa | | | 2.52 |
| G°/sin delta @ 10 rad/sec, kPa | | 1.0 min. | 2.67 |
| Second Temperature, °C | | | 82 |
| Phase Angle, degrees | | | 70.9 |
| G° @ 10 rad/sec, kPa | | | 1.44 |
| G°/sin delta @ 10 rad/sec, kPa | | 1.0 min. | 1.53 |

FIG. 4B

TABLE 12 (Part 2)

| Florida Superpave PG+ Binder Specification Tests | | | |
|---|---|---|---|
| AASHTO M320 ORG. Pass/Fail TEMPERATURE, °C | | | 86.8 |
| RTFO Residue Tests: | | | |
| Mass Loss, % | T 240 | 1.0 max | -0.500 |
| Dynamic Shear Rheometer | T 315 | | |
| Passing Temperature, °C | | | 76 |
| Phase Angle, degrees | | | 67.3 |
| G°@ 10 rad/sec, kPa | | | 4.41 |
| G°/sin delta @ 10 rad/sec, kPa | | 2.2 min. | 4.78 |
| Second Temperature, °C | | | 82 |
| Phase Angle, degrees | | | 88.4 |
| G°@ 10 rad/sec, kPa | | | 2.52 |
| G°/sin delta @ 10 rad/sec, kPa | | 2.2 min | 2.71 |
| Multiple Stress Creep Recovery AASHTO TP 70 | | | 67 |
| Jnr, 3.2 kPa average % recovery | | max. Jnr, diff=75% | 52.30 |
| % Recovery | | %R3.2>29.37(Jnr, 3.2)^-0.2633 | 41.46 |
| AASHTO M320 TRFO Pass/Fail Temperature, °C | | | 84.3 |
| PAV Residue Tests: | | | PAV 100 |
| Dynamic Shear Rheometer | T 315 | | |
| Passing Temperature, °C | | | 26.5 |
| Phase Angle, degrees | | | 46.6 |
| G°@ 10 rad/sec, kPa | | | 3630 |
| G°sin delta @ 10 rad/sec, kPa | | 5,000.0 max. | 2640 |
| Bending Beam Rheometer | T 313 | | |
| Passing Temperature, °C | | | -12 |
| s, 60s, Mpa | | 300.0 max. | 154 |
| m-value, 60's | | 0.3 min. | 0.351 |
| Second Temperature, °C | | | -18 |
| s, 60s, Mpa | | 300.0 max | 311 |
| M-value, 60s | | 0.3 min. | 0.291 |
| Tcr at 3 = 300 Mpa | | | -27.69 |
| Tcr at m = 0.300 | | | -27.10 |
| BBR Tcr | | | -27.10 |

FIG. 5A
TABLE 13 (Part 1)

| Florida Superpave PG+ Binder Specification Tests | | | |
|---|---|---|---|
| Material Supplier | | | |
| Supplier Sample ID | | | 76-22 ARB BOL:51077 |
| Supervisor | RD | | |
| Date Tested | 05/14/2013 | | |
| QPL | S916-0215 | | |
| Florida DOT PG+ Grade | | | PG 76-22 |
| AASHTO M320 Continuous PG Grade | | | PG 81.82-27.52 |
| DLSI Internal ID | | | SFMC_76-22 ARB |
| | AASHTO Std. | AASHTO Limits | |
| Un-aged Org Binder Tests: | | | |
| Flash Point, °C | T 48 | 232.22 °C min. | 315 |
| Viscosity-Rotational, Pa-s 135 C | T 316 | 3.0 max. | 2.900 |
| Cigar Cubes Separation at 163C 48 hours | | | |
| Softening Point, Top | T53 | 15F max dif. | 136.58 |
| Softening Point, Bottom | T53 | | 144.86 |
| Dynamic Shear Rheometer | | T 315 | |
| Passing Temperature, °C | | | 76 |
| Phase Angle, degrees | | 75° max. | 73.6 |
| G°@ 10 rad/sec, kPa | | | 1.67 |
| G°/sin delta @ 10 rad/sec, kPa | | 1.0 min. | 1.75 |
| Second Temperature, °C | | | 82 |
| Phase Angle, degrees | | | 75.4 |
| G°@ 10 rad/sec, kPa | | | .96 |
| G°/sin delta @ 10 rad/sec, kPa | | 1.0 min. | 0.99 |

FIG. 5B
TABLE 13 (Part 2)

| Florida Superpave PG+ Binder Specification Tests | | | |
|---|---|---|---|
| AASHTO M320 ORG. Pass/Fail TEMPERATURE, °C | | | 81.8 |
| RTFO Residue Tests: | | | |
| Mass Loss, % | T 240 | 1.0 max. | -0.535 |
| Dynamic Shear Rheometer | T 315 | | |
| Passing Temperature, °C | | | 76 |
| Phase Angle, degrees | | | 69.3 |
| G° @ 10 rad/sec, kPa | | | 4.05 |
| G°/sin delta @ 10 rad/sec, kPa | | 2.2 min. | 4.33 |
| Second Temperature, °C | | | 82 |
| Phase Angle, degrees | | | 71.0 |
| G° @ 10 rad/sec, kPa | | | 2.29 |
| G°/sin delta @10 rad/sec, kPa | | 2.2 min. | 2.42 |
| Multiple Stress Creep Recovery AASHTO TP 70 | | | 67 |
| Jnr, 3.2 kPa average % recovery | | max Jnr, diff=75% | 45.11 |
| % Recovery | | %R3.2>29.37(Jnr, 3.2 ^-0.2633 | 38.72 |
| AASHTO M320 RTFO Pass/Fail Temperature, °C | | | 83.0 |
| PAV Residue Tests: | | | PAV 100 |
| Dynamic Shear Rheometer | T 315 | | |
| Passing Temperature, °C | | | 26.5 |
| Phase Angle, degrees | | | 46.5 |
| G° @ 10 rad/sec, kPa | | | 3510 |
| G°sin delta @ 10 rad/sec, kPa | | 5,000.0 max. | 2540 |
| Bending Beam Rheometer | T 313 | | |
| Passing Temperature, °C | | | -12 |
| s, 60s, Mpa | | 300.0 max. | 148 |
| m-value, 60's | | 0.3 min. | 0.352 |
| Second Temperature, °C | | | -18 |
| s, 60s, Mpa | | 300.0 max | 319 |
| M-value, 60s | | 0.3 min. | 0.301 |
| Tcr at 3 = 300 Mpa | | | -27.52 |
| Tcr at m = 0.300 | | | -28.12 |
| BBR Tcr | | | -27.52 |

MICRONIZED ASPHALT MODIFIERS, METHODS OF MODIFYING ASPHALT, ASPHALT COMPOSITIONS AND METHODS OF MAKING

RELATED APPLICATION DATA

This application is a Continuation of U.S. patent application Ser. No. 14/304,966 filed Jun. 15, 2014 and now issued as U.S. Pat. No. 9,896,582 on Feb. 20, 2018, which is a Continuation-In-Part of U.S. patent application Ser. No. 1/311,445, filed Dec. 5, 2011, now issued as U.S. Pat. No. 8,784,554, which is a Continuation-In-Part of U.S. patent application Ser. No. 12/399,960, filed Mar. 8, 2009, now abandoned, all prior applications herein incorporated by reference.

BACKGROUND OF THE INVENTION

1. Field of the Invention

The present invention relates to asphalt compositions, asphalt modifiers, methods of making and using such compositions and modifiers, methods of modifying asphalt, and asphalt products.

2. Brief Description of the Related Art

Asphalt is a sticky, black and highly viscous liquid or semi-solid that is present in most crude petroleum and in some natural deposits. In U.S. terminology, asphalt (or asphalt cement) is the carefully refined residue from the distillation process of selected crude oils. Outside North America, the product is called bitumen.

Asphalt binder is a key ingredient in pavements, roofing and waterproofing applications. The primary use of asphalt is in road construction, where it is used as the glue or binder for the aggregate particles, and accounts for approximately 80% of the asphalt consumed in the United States. The most common type of flexible pavement surfacing in the United States is hot mix asphalt (HMA) that may also be known by many different names such as hot mix, asphalt concrete (AC or ACP), asphalt, blacktop or bitumen.

After use of asphalt in road construction, roofing applications, mainly in the form of roofing shingles account for most of the remaining asphalt consumption. Other uses include waterproofing applications.

Asphalt binder as produced by the refining process does not have the desired stiffness modulus for heavy load bearing for use in heavily trafficked pavements such as the Interstate Highways as well as heavily trafficked inner city streets. Until now polymers such as Styrene Butadiene Styrene (SBS) Styrene Butadiene Rubber (SBR), Ethylene Vinyl Acetate (EVA), Fischer-Tropsch Waxes, Elvaloy Ter-Polymers, Natural and Synthetic Latex and Crumbed Tire Rubber and also combinations of one or more of these have been used as asphalt binder modifiers.

Over the past seven years or so, traditional Hot Mix has been under scrutiny due to hydrocarbon emissions, energy cost and difficulties in compaction after long hauls and in cold weather paving. A new technology called "Warm Mix" asphalt emerged around year 2000 and was promoted by the National Pavement Association (NAPA) of the USA and this technology grew very rapidly and a large number of available Warm Mix technologies have emerged in recent years. Currently there are at least 20 such technologies available to the paving industry and the number is growing. The key benefits of Warm Mix are a reduction in asphalt aggregate mixing, transportation, lay down and paving temperatures by between 30° F. to 70° F. and providing benefits such as drastically reduced emissions during production, drastically reduced emissions during paving, energy savings, facilitating longer hauls to paving sites, wider paving window such as early paving in Spring and later paving into Fall and superior compaction over Hot Mix.

Adequate compaction is one of the prerequisites for a long lasting pavement and is difficult to achieve especially with highly modified stiff binders as well as with gap graded mixes such as Stone Mastic asphalt (SMA) and Open Graded Friction Courses (OGFC). Another challenge in achieving adequate compaction is cold climate paving and long haul distances where the mixing plants are located far from the paving sites. Compaction is considered so important by Federal and State authorities that in many cases contractors are awarded bonuses for achieving the target compaction consistently. It is well documented from global field trial and commercial data that Warm Mix applications achieve consistent and on target compaction even in cold weather and with difficult mixes. Also, enhanced compaction through Warm Mix applications a significant development since stiffer binders are being paved to carry the heavier loads and increasing numbers of vehicles on the roads.

Another major development that has emerged in recent years is the issue of personal heath and the related hydrocarbons exposure to paving crews and the motoring public. There is a strong movement to reduce such emissions and Warm Mix technology provides the scope to achieve the targeted new permissible emissions levels. Also, in the context of Green House emissions, there is a strong movement to limit greenhouse gas emissions by asphalt mixing plants as a contribution to limiting this major problem. In Europe the limitations are in place already forcing the paving industry to use green fuels and reduce usage of fuel making Warm Mix the technology of choice. In the USA the use of Warm Mix is gaining momentum at an accelerating pace.

The unpredictable surges in fuel cost have made the energy cost of running asphalt mixing plants a severe cost burden. Warm Mix achieves on average about a 20% savings in energy cost and this is a substantial reduction aside from the benefits of reduced stack emissions from the reduced volume of fuel required for the same tonnage of output by Warm Mix over Hot Mix.

Several technologies are presently in use or in trials or in development as Warm Mix technologies and these may be classified into the following categories: (a) hard waxes such as Fischer-Tropsch® Waxes; (b) surfactants such as a combination of anti-strip agent and other organic additives, and surfactants plus water solution; (c) foaming technologies incorporating hydrated alumino-silicates; (d) foaming technologies incorporating the use of water either into a portion of the fine aggregate feed (such as the Low Energy Asphalt process) or direct atomization of water into the hot binder (such as the Double Barrel Green process).

A major concern of the Warm Mix process is the risk of moisture damage and this is being studied with earnest to assess this risk potential. Firstly, since Warm Mixes are produced at lower temperatures, there remains the risk that the aggregates are not completely dried as with Hot Mix. Secondly, there is the temptation to push Warm Mix to the ultimate limits without any proven data on moisture sensitivity and this may expose potential such risk even further. Thirdly, the use of water as the foaming agent is questionable since it has long been established that if water is left on the surface of the aggregate it will reduce the adhesion of the asphalt binder on to the aggregate causing adhesive failure with time. Also any water present in the binder will reduce the cohesive strength of the asphalt binder over time and cause cohesive failure.

U.S. Pat. No. 4,267,085, issued May 12, 1981 to Katoh et al., discloses injection materials for railroad track beds. Specifically, in a railroad track bed an injected layer is formed between the railroad ties and the roadbed so as to protect the latter. The injected layer is composed of an injection material injected through openings formed in the tie. The injection material has a viscosity below 30 poise at a temperature not higher than 200. degree. C. before hardening, and when hardened it has a compressive stress at 10% strain of 0.4 to 30 kg/cm.sup.2 at a compressive strain rate at 40. degree. C. of 1.5% per minute. The blend material may include asphalt and a low molecular weight polypropylene having a molecular weight of 500-8000 or a high molecular weight polypropylene having a molecular weight of 10,000-100,000.

U.S. Pat. No. 5,952,412 to Greenberg, et al., issued Sep. 14, 1999 for pelletized rubber, discloses rubber pellets made of an amount of vulcanized rubber and an amount of binder, with the vulcanized rubber preferably being discarded rubber. Additionally discloses that the rubber pellets will preferably contain an amount of filler materials which are plastic or rubber or combinations thereof so that the preferred rubber pellet contains an amount of rubber equal to between about 50% and about 95% by weight of the rubber pellet, an amount of filler material equal to between about 0 and about 45% by weight of the rubber pellet, and an amount of binder equal to between about 5% and about 10% by weight of the rubber pellet. Further discloses that the rubber pellets are used in the formation of asphalt and are desirable because they provide necessary constituents to the asphalt and allow for elimination of equipment and separate ingredient addition steps from the asphalt formation process. Further discloses the invention is also desirable because it provides for a way to desirably dispose of waste rubber materials.

U.S. Patent Application Publication No. 20020042477, published Apr. 11, 2002, to Jelling, discloses polymers which have been functionalized so as to be able to chemically react with polyamines to form adducts containing at least one or more groups consisting of amino, amido, imino, imido, or imidazloyl. Furthermore, the invention teaches processes to prepare these adducts by solution, melt or in-situ methods. A further embodiment of the invention pertains to the use of polyolefin plastomers or elastomers, elastomeric polyethylene-polypropylene, compositions or interpolymers of styrenes olefins, which have been chemically modified so that they react with polyamines to confer to asphalt significantly improved desired chemical and physical properties.

U.S. Pat. No. 6,444,731 to Memon, issued Sep. 3, 2002, discloses a method for manufacturing modified asphalt characterized by adding a dispersion agent such as furfural or vegetable oil to a modifier material and then mixing the modifier material with asphalt. Further discloses that the dispersion agent facilitates dispersion of the modifier through the asphalt to form a homogeneous mixture. Further discloses that a first activator is added to the mixture to produce a devulcanized and stabilized asphalt material having improved rheological, separation and solubility characteristics. Further discloses that a micro activator is also added to the mixture to improve the ductility of the modified asphalt. Further discloses that the modifier material comprises granular crumb rubber or polymer.

U.S. Pat. No. 6,588,974 issued Jul. 8, 2003, and U.S. Pat. No. 6,913,416 issued Jul. 5, 2005, both to Hildebrand, et al., disclose bitumen or asphalt for the production of road surfaces, road surfaces, and method for the preparation of bitumen or asphalt. The bitumen or asphalt contains a proportion of paraffin obtained by Fischer-Tropsch synthesis (FT paraffin). Also disclosed are a road topping with the bitumen and a method for producing a corresponding road topping or roadway covering using the bitumen.

U.S. Patent Application No. 20060223916, by Stuart Jr. et al., discloses et al. Oct. 5, 2006 a modified asphalt composition is provided comprising at least one plastomer, at least one elastomer, and asphalt. More specifically, a modified asphalt composition is provided comprising an oxidized polyethylene, a styrene-butadiene-styrene block copolymer, and asphalt. A hot mix asphalt composition is also provided comprising the modified asphalt composition and aggregate. Processes for producing the modified asphalt composition and the hot mix asphalt composition is also provided as well as articles produced from these inventive compositions.

U.S. Patent Application Publication No. 20070218250, published Sep. 20, 2007, to Kiik et al., disloses roofing material that consists essentially of a substrate, a hot melt material applied to one side of the substrate, an asphalt material coating the other side of the substrate and roofing granules disposed on said asphalt material coated on the substrate. The hot melt material may be polyethylene, polyethylene-vinyl acetate, polypropylene, polyvinylidene chloride, polyester, nylon and mixtures thereof. The asphalt material may include non-asphaltic filler.

U.S. Patent Application Publication No. 20080153945, published Jun. 26, 2008, to Prejean, discloses a polymer-modified asphalt composition comprising an elastomeric polymer blend, a low molecular weight plastomer which may be a polyolefin wax, and an un-modified asphalt. Asphalt compositions of the present invention demonstrate improved elasticity and stiffness compared to conventional polymer-modified asphalt compositions.

U.S. Patent Application Publication No. 20090053405, published Feb. 26, 2009, to Martin, discloses bituminous asphalt binder materials that are modified by the addition of crumb rubber or ground tire rubber and a cross-linking agent are described. In addition, methods are provided for producing a modified asphalt binder containing crumb rubber or ground tire rubber and a cross-linking agent. The modified asphalt binders comprise neat asphalt, crumb rubber, one or more acids and a cross-linking agent. Optionally, the modified asphalt binder may include one or more polymer additives, including, polyethylene (linear or crosslinked) and polypropylene (atactic or isotactic). The crumb rubber may be obtained from recycled truck and/or automobile tires. The addition of crumb rubber in asphalt binders can improve the consistency and properties of the asphalt binders at high and low temperatures. In particular, the modified asphalt binders of the present invention exhibit improved elastic behavior, resulting in improved performance of roads or other surfaces paved using the modified asphalt binder. Road resistance to permanent deformation, fatigue cracking and thermal cracking is improved by use of the modified asphalt binder.

U.S. Patent Application Publication No. 20090054562, pubished, Feb. 26, 2009, to Martin, discloses in a first aspect, bituminous asphalt binder materials which are modified by the addition of crumb rubber or ground tire rubber are described, and discloses in a second aspect, the present invention is directed to methods of producing a modified asphalt binder containing crumb rubber or ground tire rubber. The modified asphalt binders comprise neat asphalt, crumb rubber, one or more synthetic polymers which may include polyethylene, and one or more acids. The crumb rubber may be obtained from recycled truck and/or automobile tires.

The stability of polymer modified asphalt is generally determined by the Separation test ('cigar tube test') ASTM D 7173; Determining Separation Tendency of Polymer from Polymer Modified Asphalt. The closer the temperature between the top and the bottom of the cigar tube, the higher the stability. The guidelines as issued by the American Association of State Highway and Transportation Officials (AASHTO) are utilized in many asphalt road formulations. The AASHTO has standardized test designations in the form of T ### for standard laboratory specifications. For example, the AASHTO Cigar Tube Test is T 53. SBS is regarded as the gold standard benchmark for modifying asphalt, with SBS modified asphalt having a cigar test of 2° C. (3.6° F.) temperature differential. Recent price spikes and shortages of SBS have led to a search for other polymers as replacements for SBS in order to modify asphalt. However, while cheaper and/or more available replacement polymers can be found, the stability of the replacement polymers has generally been disappointing. For example, ground tire rubber (GTR) modified asphalt will have a cigar tube test result of 30° F. difference or worse. Some departments of transportation will allow a cigar test result as high as 15° F., while others sometimes waive the 2° C. requirement entirely. However, future trends point to the enforcement of 2° C. (3.6° F.) cigar tube standard, meaning that either SBS will have to be used, or a suitable replacement found.

All of the patents, publications, articles and/or materials cited in this specification, are herein incorporated by reference.

However, in spite of the above advancements, there still exists a need in the art for asphalt compositions and products, and to methods of making and using such compositions and products.

This and other needs in the art will become apparent to those of skill in the art upon review of this specification, including its drawings and claims.

SUMMARY OF THE INVENTION

It is an object of the present invention to provide asphalt compositions and products, and to methods of making and using such compositions and products.

This and other objects of the present invention will become apparent to those of skill in the art upon review of this specification, including its drawings and claims.

According to one non-limiting embodiment of the present invention, there is provided an asphalt comprising petroleum asphalt a polyolefin component and, a wax component.

According to another non-limiting embodiment of the present invention, there is provided a method of treating a petroleum asphalt, the method comprising, contacting a petroleum asphalt with a polyolefin component and a wax component to form a treated asphalt.

According to even another non-limiting embodiment of the present invention, there is provided an asphalt additive comprising polyolefin component, and a wax component.

According to still another non-limiting embodiment of the present invention, there is provided an asphalt comprising a first component comprising a petroleum asphalt; a second component comprising particles comprising a polyolefin and a binder; wherein the second component is dispersed within the first component.

According to yet another non-limiting embodiment of the present invention, there is provided a method of treating a petroleum asphalt, the method comprising, contacting a petroleum asphalt with particles comprising a polyolefin component and a binder component to form a treated asphalt.

According to still another non-limiting embodiment of the present invention, there is provided a method of making an asphalt additive comprising forming particles from a melted mixture comprising a polyolefin and a binder.

Various sub-embodiments of the above embodiments include sub-embodiments: wherein the polyolefin component comprises at least one selected from the group of C2 to C36 polyolefin homo-polymers, blends of two or more such polymers, and copolymers of two or more such polymers, and the binder component may comprise a petroleum micro-wax derived from crude oil refining processes; wherein the polyolefin component comprises a melting point range from 115° C. to 250° C.; wherein the polyolefin component comprises at least one selected from the group of polypropylene homo-polymers and ethylene/propylene copolymers, and the wax component comprises a petroleum micro-wax derived from crude oil refining processes; wherein the wax component comprises a melting point in the range of 150° F. (66° C.) to 220° F. (104° C.); and/or wherein the binder component is selected from the group consisting of: Polyolefin waxes, Polyethylene By-Product Waxes, Fischer-Tropsch Hard Wax, SBS, SB, SEBS, SBR, Natural and Synthetic Latex, crumb Tire Rubber and Elvaloy Terpolymer, Trinidad Lake Asphalt (TLA), Gilsonite, Montan Waxes, tall oil and tall oil derived products (both solids and liquids), vegetable oils, synthetic and petroleum microcrystalline waxes, and natural Rubber. In some non-limiting embodiments, the binder comprises a wax.

According to another non-limiting of the present invention, there is provided an asphalt comprising: a first component comprising a petroleum asphalt; and, a second component comprising particles formed from a melted mixture of a resin and a binder; wherein, the second component is dispersed within the first component; wherein the resin is selected from the group consisting of at least one polymer alpha olefin selected from the group consisting of polyethylene homopolymer, homopolymers formed from α-olefins having more than 3 carbon atoms, and copolymers formed from 2 or more different α-olefins having 2 or more carbon atoms; and, wherein the binder is selected from the group consisting of polyethylene by-product waxes, petroleum micro waxes, Fischer-Tropsch hard wax, Trinidad Lake asphalt (TLA), gilsonite, terpolymer, and montan waxes.

According to another non-limiting of the present invention, there is provided a method of treating a petroleum asphalt, the method comprising: contacting a petroleum asphalt with particles formed from a melted mixture of a resin component and a binder component to form a treated asphalt, wherein the resin is selected from the group consisting of at least one polymer alpha olefin selected from the group consisting of polyethylene homopolymer, homopolymers formed from α-olefins having more than 3 carbon atoms, and copolymers formed from 2 or more different α-olefins having 2 or more carbon atoms; and, wherein the binder is selected from the group consisting of polyethylene by-product waxes, petroleum micro waxes, Fischer-Tropsch hard wax, Trinidad Lake asphalt (TLA), gilsonite, terpolymer, and montan waxes.

According to another non-limiting of the present invention, there is provided an asphalt comprising: a first component comprising a petroleum asphalt; a second component dispersed in the asphalt comprising particles formed from a melted mixture of a resin and a binder; and, a third component dispersed in the asphalt selected from the group consisting of ground tire rubber and polymers of styrene and butadiene, wherein the resin is selected from the group consisting of at least one polymer alpha olefin selected from the group consisting of polyethylene homopolymer, homopolymers formed from α-olefins having more than 3 carbon atoms, and copolymers formed from 2 or more different α-olefins having 2 or more carbon atoms; and, wherein the binder is selected from the group consisting of polyethylene by-product waxes, petroleum micro waxes, Fischer-Tropsch hard wax, Trinidad Lake asphalt (TLA), gilsonite, terpolymer, and montan waxes.

According to another non-limiting of the present invention, there is provided a method of modifying a petroleum asphalt, the method comprising: combining the petroleum asphalt with a first component and a second component, wherein the first component comprises particles formed from a melted mixture of a resin and a binder; and, the second component is selected from the group consisting of ground tire rubber and polymers of styrene and butadiene, wherein the resin is selected from the group consisting of at least one polymer alpha olefin selected from the group consisting of polyethylene homopolymer, homopolymers formed from α-olefins having more than 3 carbon atoms, and copolymers formed from 2 or more different α-olefins having 2 or more carbon atoms; and, wherein the binder is selected from the group consisting of polyethylene by-product waxes, petroleum micro waxes, Fischer-Tropsch hard wax, Trinidad Lake asphalt (TLA), gilsonite, terpolymer, and montan waxes.

According to another non-limiting of the present invention, there is provided an asphalt comprising: a first component comprising a petroleum asphalt; and, a second component comprising particles formed from a melted mixture of a resin and a binder; wherein, the second component is dispersed within the first component; wherein the resin is selected from the group consisting ethylene vinyl acetate; polystyrene; styrene butadiene block copolymer; styrene ethylene butylene styrene; natural rubber, synthetic rubber; styrene-butadiene rubbers; and, wherein the binder is selected from the group consisting of polyethylene by-product waxes, petroleum micro waxes, Fischer-Tropsch hard wax, Trinidad Lake asphalt (TLA), gilsonite, terpolymer, and montan waxes.

According to another non-limiting of the present invention, there is provided a method of treating a petroleum asphalt, the method comprising: contacting a petroleum asphalt with particles formed from a melted mixture of a resin component and a binder component to form a treated asphalt, wherein the resin is selected from the group consisting ethylene vinyl acetate; polystyrene; styrene butadiene block copolymer; styrene ethylene butylene styrene; natural rubber, synthetic rubber; styrene-butadiene rubbers; and, wherein the binder is selected from the group consisting of polyethylene by-product waxes, petroleum micro waxes, Fischer-Tropsch hard wax, Trinidad Lake asphalt (TLA), gilsonite, terpolymer, and montan waxes.

According to another non-limiting of the present invention, there is provided an asphalt comprising: a first component comprising a petroleum asphalt; a second component dispersed in the asphalt comprising particles formed from a melted mixture of a resin and a binder; and, a third component dispersed in the asphalt selected from the group consisting of ground tire rubber and polymers of styrene and butadiene, wherein the resin is selected from the group consisting of ethylene vinyl acetate; polystyrene; styrene butadiene block copolymer; styrene ethylene butylene styrene; natural rubber, synthetic rubber; styrene-butadiene rubbers; and, wherein the binder is selected from the group consisting of polyethylene by-product waxes, petroleum micro waxes, Fischer-Tropsch hard wax, Trinidad Lake asphalt (TLA), gilsonite, terpolymer, and montan waxes.

According to another non-limiting of the present invention, there is provided a method of modifying a petroleum asphalt, the method comprising: combining the petroleum asphalt with a first component and a second component, wherein the first component comprises particles formed from a melted mixture of a resin and a binder; and, the second component is selected from the group consisting of ground tire rubber and polymers of styrene and butadiene, wherein the resin is selected from the group consisting of ethylene vinyl acetate; polystyrene; styrene butadiene block copolymer; styrene ethylene butylene styrene; natural rubber, synthetic rubber; styrene-butadiene rubbers; and, wherein the binder is selected from the group consisting of polyethylene by-product waxes, petroleum micro waxes, Fischer-Tropsch hard wax, Trinidad Lake asphalt (TLA), gilsonite, terpolymer, and montan waxes.

According to another non-limiting of the present invention, there is provided an asphalt comprising: a first component comprising a petroleum asphalt; and, a second component comprising particles formed from a melted mixture of a resin and a binder; wherein, the second component is dispersed within the first component; wherein the resin is selected from the group consisting of reactive elastomeric terpolymers, polymers having glycidyl functionality, polymers having glycidyl acrylate functionality, and polymers having epoxide functionality; and, wherein the binder is selected from the group consisting of polyethylene by-product waxes, petroleum micro waxes, Fischer-Tropsch hard wax, Trinidad Lake asphalt (TLA), gilsonite, and montan waxes.

According to another non-limiting of the present invention, there is provided a method of treating a petroleum asphalt, the method comprising: Contacting a petroleum asphalt with particles formed from a melted mixture of a resin component and a binder component to form a treated asphalt, wherein the resin is selected from the group consisting of reactive elastomeric terpolymers, polymers having glycidyl functionality, polymers having glycidyl acrylate functionality, and polymers having epoxide functionality; and, wherein the binder is selected from the group consisting of polyethylene by-product waxes, petroleum micro waxes, Fischer-Tropsch hard wax, Trinidad Lake asphalt (TLA), gilsonite, and montan waxes.

According to another non-limiting of the present invention, there is provided an asphalt comprising: a first component comprising a petroleum asphalt; a second component dispersed in the asphalt comprising particles formed from a melted mixture of a resin and a binder; and, a third component dispersed in the asphalt selected from the group consisting of ground tire rubber and polymers of styrene and butadiene, wherein the resin is selected from the group consisting reactive elastomeric terpolymers, polymers having glycidyl functionality, polymers having glycidyl acrylate functionality, and polymers having epoxide functionality; and, wherein the binder is selected from the group consisting of polyethylene by-product waxes, petroleum micro waxes, Fischer-Tropsch hard wax, Trinidad Lake asphalt (TLA), gilsonite, and montan waxes.

According to another non-limiting of the present invention, there is provided a method of modifying a petroleum asphalt, the method comprising: combining the petroleum asphalt with a first component and a second component to form a modified asphalt, wherein the first component comprises particles formed from a melted mixture of a resin and a binder; and, the second component is selected from the group consisting of ground tire rubber and polymers of styrene and butadiene, wherein the resin is selected from the group consisting of reactive elastomeric terpolymers, polymers having glycidyl functionality, polymers having glycidyl acrylate functionality, and polymers having epoxide functionality; and, wherein the binder is selected from the group consisting of polyethylene by-product waxes, petroleum micro waxes, Fischer-Tropsch hard wax, Trinidad Lake asphalt (TLA), gilsonite, and montan waxes.

According to another non-limiting of the present invention, there is provided an asphalt comprising: a first component comprising a petroleum asphalt; and, a second component comprising particles formed from a melted mixture of a resin and a binder; wherein, the second component is dispersed within the first component; wherein the resin is polypropylene homopolymer; and, wherein the binder comprises a terpolymer comprising at least one of glycidyl functionality, glycidyl acrylate functionality, or epoxide functionality.

According to another non-limiting of the present invention, there is provided a method of treating a petroleum asphalt, the method comprising: contacting a petroleum asphalt with particles formed from a melted mixture of a resin component and a binder component to form a treated asphalt, wherein the resin is polypropylene homopolymer; and, wherein the binder comprises a terpolymer comprising at least one of glycidyl functionality, glycidyl acrylate functionality, or epoxide functionality.

According to another non-limiting of the present invention, there is provided an asphalt comprising: a first component comprising a petroleum asphalt; a second component comprising particles formed from a melted mixture of a resin and a binder; and, a third component dispersed in the asphalt selected from the group consisting of ground tire rubber and polymers of styrene and butadiene, wherein the resin is polypropylene homopolymer; and, wherein the binder comprises a terpolymer comprising at least one of glycidyl functionality, glycidyl acrylate functionality, or epoxide functionality.

According to another non-limiting of the present invention, there is provided a method of modifying a petroleum asphalt, the method comprising: combining the petroleum asphalt with a first component and a second component, wherein the first component comprises particles formed from a melted mixture of a resin and a binder; and, the second component is selected from the group consisting of ground tire rubber and polymers of styrene and butadiene, wherein the resin is polypropylene homopolymer; and, wherein the binder comprises a terpolymer comprising at least one of glycidyl functionality, glycidyl acrylate functionality, or epoxide functionality.

According to another non-limiting of the present invention, there is provided an asphalt comprising: a first component comprising a petroleum asphalt; and, a second component comprising particles of resin; wherein the resin is selected from the group consisting of polyalphaolefins, ethylene vinyl acetate, polystyrene, styrene butadiene block copolymer, styrene ethylene butylene styrene, natural rubber, synthetic rubber, styrene-butadiene rubbers, reactive elastomeric terpolymers, polymers having glycidyl functionality, polymers having glycidyl acrylate functionality, and polymers having epoxide functionality; and the resin particles have a diameter less than about 420 microns.

According to another non-limiting of the present invention, there is provided a method of treating a petroleum asphalt, the method comprising: contacting a petroleum asphalt with particles of resin component, wherein the resin is selected from the group consisting of polyalphaolefins, ethylene vinyl acetate, polystyrene, styrene butadiene block copolymer, styrene ethylene butylene styrene, natural rubber, synthetic rubber, styrene-butadiene rubbers, reactive elastomeric terpolymers, polymers having glycidyl functionality, polymers having glycidyl acrylate functionality, and polymers having epoxide functionality; and the resin particles have a diameter less than about 420 microns.

According to another non-limiting of the present invention, there is provided an asphalt comprising: a first component comprising a petroleum asphalt; a second component dispersed in the asphalt comprising resin particles; and, a third component dispersed in the asphalt selected from the group consisting of ground tire rubber and polymers of styrene and butadiene, wherein the resin is selected from the group consisting of polyalphaolefins, ethylene vinyl acetate, polystyrene, styrene butadiene block copolymer, styrene ethylene butylene styrene, natural rubber, synthetic rubber, styrene-butadiene rubbers, reactive elastomeric terpolymers, polymers having glycidyl functionality, polymers having glycidyl acrylate functionality, and polymers having epoxide functionality; and the resin particles have a diameter less than about 420 microns.

According to another non-limiting of the present invention, there is provided a method of modifying a petroleum asphalt, the method comprising: combining the petroleum asphalt with a first component and a second component to form a modified asphalt, wherein the first component comprises resin particles; and, the second component is selected from the group consisting of ground tire rubber and polymers of styrene and butadiene, wherein the resin is selected from the group consisting of polyalphaolefins, ethylene vinyl acetate, polystyrene, styrene butadiene block copolymer, styrene ethylene butylene styrene, natural rubber, synthetic rubber, styrene-butadiene rubbers, reactive elastomeric terpolymers, polymers having glycidyl functionality, polymers having glycidyl acrylate functionality, and polymers having epoxide functionality; and the resin particles have a diameter less than about 420 microns.

According to another non-limiting of the present invention, there is provided a method of modifying a petroleum asphalt, the method comprising: combining the petroleum asphalt with an additive to form a modified asphalt, wherein the additive comprises ground tire rubber and resin, wherein the resin is selected from the group consisting of reactive elastomeric terpolymers, polymers having glycidyl functionality, polymers having glycidyl acrylate functionality, and polymers having epoxide functionality.

BRIEF DESCRIPTION OF THE DRAWINGS

FIG. 1 is TABLE 7, Separation Test Results for Test Highway using Rheopave 10XP.

FIG. 2 is TABLE 9, PG67-22 Base Asphalt Upgraded to PG76-22 GTR with MSCR Specification.

FIG. 3 is TABLE 11 for PG (ARB)-22 Test Sections.

FIGS. 4A and 4B are TABLE 12, Part 1 and TABLE 12, Part 2, respectively, showing certification for the Rheopave modified asphalt.

FIGS. 5A and 5B are TABLE 13, Part 1 and TABLE 13, Part 2, respectively, showing certification for the Rheopave modified asphalt.

DETAILED DESCRIPTION OF THE INVENTION

This invention describes an additive used as an asphalt binder modifier that in some embodiments includes a polymer component that is the primary rheology modifying component, and a secondary rheology modifying component. In some non-limiting embodiments of the present invention, the primary rheology modifying component and the secondary rheology modifying component are melted together into a single liquid phase before being formed into a solid asphalt additive. In other non-limiting embodiments, the additive comprises only the primary rheology modifying component(s). This invention may find applicability with any type of asphalt including straight asphalt and blown asphalt. As a more particular non-limiting example, this invention finds applicability in paving applications with straight asphalt. As non-limiting examples, the additive may be in some sort of solid form, non-limiting exaples of which include a one pack additive in pastille, bead, pill or granule form. In some non-limiting embodiments, the additive provides for Pavement and Roofing applications that meet the target Performance Grading (PG) in terms of binder stiffness (as measured by the Dynamic Shear Rheometer or Softening Point) and Low Temperature flexibility (as measured by Bending Beam Rheometer or Fraas Breaking point or Mandrel Bending Test). Further, this invention may be formulated by specific design to produce the desired binder within the "Warm Mix Asphalt" concept for Paving applications as well as reduced temperature and enhanced application speeds for Roofing applications. In other non-limiting embodiments, the additive of the present invention functions to stabilize ground tire rubber in asphalt as measured by the cigar tube test.

Some embodiments of the present invention may also find use in providing roofing and paving materials having improved UV resistance.

Some non-limiting methods of the present invention may obviate the need for grinding of polymers at the point of mixing with bitumen.

Some non-limiting embodiments of the present invention may facilitate the addition of crumb rubber to asphalt.

Some non-limiting embodiments of the present invention may prevent or reduce phasing of crumb rubber in asphalt formulations.

In some embodiments, the combined effect of the additive package may be to reduce the asphalt aggregate mixing, transportation, lay down and/or compaction temperatures, by between 10° C. (50° F.) to 32° C. (90° F.) as a non-limiting example. Further, in certain embodiments, this invention may provide the benefit of enhancing the useful temperature range of the modified asphalt binder. This additive may be used to modify the asphalt binder first and then add to the aggregate mix or it may be added directly to the aggregate mixing drum whether a continuous drum mixer or a batch mixer. Some embodiments provide ease of transportation, storage and handling.

The present invention utilizes one or more polymers as the primary rheology modifying component. In some non-limiting embodiments, this primary rheology modifying component may be a polyolefin homo-polymer or copolymer resins. In some non-limiting embodiments, the polyolefin homopolymer or copolymer is a poly α-olefin ("PAO"), which may be formed from polymerizing same (in the case homopolymer) or 2 or more different (in the case of copolymer) C2 to C36 α-olefins (i.e. α-olefins having from 2 to 36 carbon atoms). The PAO copolymers may be formed by mixing 2 or more already formed PAO's, by copolymerizing 2 or more different PAO's, by copolymerizing 2 or more different α-olefins, or any combination of the foregoing. In non-limiting examples, these polyolefin resins may include polyethylene ("PE") homopolymers, polypropylene ("PP") homo-polymer and polypropylene/polyethylene ("PP/PE") co-polymer resins and by-product waxes in asphalt modification. Since these resins have a substantially higher melting point (above 140° C.) than the base asphalt binder (approximately 60° C.), the use of such resins has been excluded since the asphalt binder would degrade and become a fume emission hazard at such high temperatures. The technology described herein is novel in producing a compound of certain polymers, as a non-limiting example the PE homo-polymer, PP Homo-polymer and/or PP plus PE co-polymer, such that the compound is uniquely dispersible in asphalt binder at the safe and usual operating temperatures. In some non-limiting embodiments, the resin is combined with a binder (in some embodiments melted together). Without being limited by theory, applicants believe that when the particles of polyolefin resin/binder (or in general the primary rheology modifying component) are heated to the melt point of the binder (or in general the secondary rheology modifying component), the binder materials quickly melt and physically partition the resin molecules such that the resin will fall apart in the hot/warm asphalt base and disperse quickly and homogenously. In this way the additive value in certain embodiments may be realized to "bump" the high temperature PG to the desired level whilst at the same time taking the Low temperature PG value to the desired grade i.e. the unique ability to "stretch the PG box" or escalate the useful performance temperature range of the asphalt binder.

A non-limiting example of suitable polyolefin materials include polyethylene (PE) homo-polymer or polypropylene (PP) homo-polymer having a molecular weight in the range of about 20,000 to about 200,000. A non-limiting example of suitable PP plus polyethylene (PE) co-polymer includes those having a molecular weight in the range of about 20,000 to about 200,000.

A second aspect of this novel invention is that the systems described herein meets the requirements of "Warm Mix Asphalt Paving".

This invention describes an asphalt/bitumen additive formulation that may be used in combination with modified or unmodified asphalt binder and aggregates to produce an aggregate paving mixture used to pave roads/pavements. In some non-limiting embodiments, the primary rheology modifying component comprises a polyolefin homo-polymer and/or copolymer in any ratio. Some non-limiting embodiments employ PE homo-polymer resin, PP Homo-polymer resin or PP plus PE co-polymer resin or combinations of these in any ratio. As a non-limiting example, the resins described herein have a melting point range of 266° F. (130° C.) to 482° F. (250° C.) and above.

While the "primary rheology modifying component" (i.e., resin component) is mostly described herein in terms of polyolefins, the primary rheology component should not be considered so limited, as there are other polymers that are believed to also be useful as the "primary rheology modifying component" in the present invention, including, but not limited to ethylene vinyl acetate; polystyrene; styrene butadiene block copolymer (SB); styrene ethylene butylene styrene (SEBS); natural rubber, synthetic rubber (most commonly styrene-butadiene rubbers (SBR) derived from the copolymerization of styrene and 1,3-butadiene; but may also include synthetic rubbers are prepared from isoprene (2-methyl-1,3butadiene), chloroprene (2-chloro-1,3-butadiene), and isobutylene (methylpropene) with a small percentage of isoprene for cross-linking); reactive elastomeric terpolymers (RET) a non-limiting example of which includes alkylene-alky acrylate-glycidyl acrylate terpolymers; polymers having glycidyl or glycidyl acrylate functionality a non-limiting example of which includes alkylene-alkylacrylate-glycidyl acrylate terpolymers, and polymers having an epoxide functionality. A non-limiting example of a suitable alkylene-alklyacrylate-glycidyl acrylate terpolymers includes ethylene-butyl acrylate-glycidyl methacrylate tepolymers, a commercial example of which are Elvaloy® terpolymers.

In some embodiments, the primary rheology modifying component will comprise at least one PAO selected from the group consisting of homopolymers and copolymers formed from α-olefins having 2 or more carbon atoms.

In some embodiments, the primary rheology modifying component will comprise at least one selected from the group consisting of polyethylene homopolymer, homopolymers formed from α-olefins having more then 3 carbon atoms, and copolymers formed from 2 or more different α-olefins having 2 or more carbon atoms.

As a non-limiting example, certain embodiments of the present invention utilize as the primary rheology modifying component, a reactive elastomeric terpolymer which in some embodiments may be in combination with polystyrene, styrene butadiene block copolymer (SB), styrene ethylene butylene styrene (SEBS), and styrene-butadiene rubbers (SBR).

As another non-limiting example, certain embodiments of the present invention utilize as the primary rheology modifying component polymers having glycidyl methacrylate functionality which in some embodiments may be in combination with polystyrene, styrene butadiene block copolymer (SB), styrene ethylene butylene styrene (SEBS), and styrene-butadiene rubbers (SBR).

Polymers with epoxide functionality, include those derived from bisphenols, non-limiting examples of which include bisphenol A, bisphenol AP, bisphenol AF, bisphenol B, bisphenol BP, bisphenol C, bisphenol E, bisphenol F, bisphenol G, bisphenol M, bisphenol S, bisphenol P, bisphenol PH, bisphenol TMC, bisphenol Z.

Some embodiments of the present invention provide the use of a secondary rheology modifying component having a lower melting point than the primary rheology modifying component, that when the additive is subjected to the hot/warm asphalt base, the secondary rheology modifying component(s) quickly melts and physically partitions the primary rheology modifying component(s) such that the primary rheology modifying component(s) will fall apart in the hot/warm asphalt base and disperse quickly and homogenously. The main requirement of the secondary rheology modifying component is that it have a lower melting point that the primary rheology modifying component, and will quickly melt when the additive is introduced to the hot/warm asphalt. The quicker that the secondary rheology modifying component can melt than the primary rheology modifying component when the additive is exposed to the hot/warm asphalt base, the better. It is believed that a wide range of polymers may function as the secondary rheology modifying component.

As non-limiting examples, sSome embodiments may employ a secondary rheology modifying component which may comprise a petroleum micro-wax obtained from conventional crude refining. This secondary rheology modifying component, or binder for the primary rheology modifying component, may act as a partitioning/dispersion agent for the primary rheology modifying component, and can be any one of waxes, vegetable oils and most hydrocarbons in the melt point range of 70 C to 135 C.

This secondary rheology modifying component may be referred to herein as a binder, dispersant, or binding, dispersing or partitioning agent. As a non-limiting example, a suitable wax may have a melting point range between 140° F. (60° C.) to 239° F. (115° C.). In some non-limiting embodiments, it may be at times be desired to use a blend of two or more separate micro-waxes in the above melt range to achieve the desired rheology properties. The dispersing effect may also be achieved through the use of an additional component that is either Crude Tall Oil (CTO) or an oxidized Tall Oil Pitch. Non-limiting examples of other secondary rheology modifiers that may be used alone or in any combination may be Low Molecular Weight PE Waxes, Fischer-Tropsch Waxes, Petroleum Paraffin Waxes, Montan Wax, SBS, SBR, Natural and Synthetic Latex, Trinidad Lake Asphalt, Gilsonite and other natural asphalts, Crumbed Tire Rubber, etc. As a non-limiting example a polyethylene ("PE") wax having a molecular weight in the range of about 650-2500, although a PE wax having a molecular weight greater or less than that range may also be suitable. As another non-limiting example, a Fischer-Tropsch wax having a molecular weight in the range of about 450-1200, although a Fischer-Tropsche wax having a molecular weight greater or less than that range may also be suitable. Another non-limiting example of suitable secondary rheology modifying components includes reactive elastomeric terpolymers (RET) a non-limiting example of which includes alkylene-alky acrylate-glycidyl acrylate terpolymers; polymers having glycidyl or glycidyl acrylate functionality a non-limiting example of which includes alkylene-alkylacrylate-glycidyl acrylate terpolymers, and polymers having an epoxide functionality. A non-limiting example of a suitable alkylene-alklyacrylate-glycidyl acrylate terpolymers includes ethylene-butyl acrylate-glycidyl methacrylate tepolymers, a commercial example of which are Elvaloy® terpolymers.

The additive package described above may contribute to the Warm Mix in the following manner:

(a) In some non-limiting embodiments, the reduction in viscosity of the asphalt binder may be achieved through the combination of rheology/viscosity modifiers described above, that in turn reduces the viscosity of the aggregate mix making it possible to compact the mix at the lower temperatures in the Warm Mix range.

(b) In some non-limiting embodiments, the CTO and or oxidized tall oil pitch acts as a dispersing agent for the primary rheology modifying component, (as a non-limiting example, polyolefin homo-polymer and co-polymer resins), and may further reduce the viscosity of the additive package thereby contributing to further improvements in compaction and increasing the useful paving window.

(c) In some non-limiting embodiments, the combination of the primary rheology modifying component (as a non-limiting example polyolefin homo-polymer and co-polymer resins) may contribute to the binder stiffness at the pavement performance temperature producing the effect of a performance grading grade bump.

(d) In some non-limiting embodiments, the combination of micro-waxes provides the effect of viscosity reduction at the paving temperatures while contributing to the binder and pavement flexibility at Low Temperatures during winter periods. In this way the stiffness of the binder may be offset at Low Temperature Performance.

(e) In some non-limiting embodiments, the CTO and oxidized CTO may perform as adhesive agents linking the asphalt binder to the aggregate surfaces.

Different combinations of the secondary rheology modification component may be used to achieve the specific desired specification/property such that several grades of the additive may be commercially produced.

The additive invention described above can easily be used in any convential Hot Mix asphalt to reduce the asphalt mix production, transportation, paving and compaction temperatures. As a non-limiting examples, to reduce temperatures by between 10° C. (50° F.) to 32° C. (90° F.). The additive package may be first added to the asphalt binder and the so modified binder may be added to the aggregate mix in a continuous drum mixer or batch mixer. Also, the additive package may be added directly to the aggregate mix in a continuous drum mixer or a batch mixer immediately after the binder comes into contact with the aggregate.

The additive package may also be used for surface dressings such as hot applied chip seals, slurry seals and such surface dressings as a viscosity reducer and to eliminate the use of volatile cut back solvents and associated fume emissions. Such Warm Mix applications may also include coatings and sealants for moisture protection as well as solvent and chemical resistance mixtures.

The additive package described herein may also be used in Roofing applications as follows:

(1) In a non-limiting example for the manufacture of roofing shingles, the asphalt binder may be modified with the described additive package to meet the target specifications (Softening Point, Penetration, Flash Point, Ductility, Tensile Strength, and/or UV restistance, etc.) and may then be coated onto the non-woven substrate (usually glass fiber).

(2) In a non-limiting example for the manufacture of Built Up Roofing (BUR) grades or Mopping Grades, the additive package described herein may be used to modify the asphalt binder to achieve the desired specifications (Softening Point, Penetration, Flash point, Ductility, Tensile Strength, etc.) and then used for Hot Applied or Emulsion Applied coatings.

(3) In a non-limiting example, the additive package may be used to manufacture adhesive coatings for roofing applications.

(4) In a non-limiting example, the additive package described herein may be used in asphalt feed stocks prior to blowing to harden the binder through oxidation. As a non-limiting example the additive package will be present in the at 0.5% up to 10% range by weight, although more than 10% and less than 0.5% are also believed to be beneficial. The benefits of this additive are reduced batch cycle times for example by 20% to 35%, less aging of the blown binder, lower viscosity and workability of the blown binder and easier achievement of target specifications. Also, this technology may enable the blowing methods to operate on a wider available pool of asphalts including fluxes and paving grades to achieve the same target specifications. In some embodiments in which the blowing operation can actually be operated at lower blowing temperatures, a wider pool of asphalts may become available for blowing.

The polyolefin homo-polymer and copolymer utilized herein may be obtained by any suitable method and means, using any suitable catalyst as is well known in the polyolefin art. As a non-limiting example, suitable polyolefin may be derived from olefins having from about 2 to about 36 carbon atoms, or may comprise blends of two or more of such polyolefins, or may comprises copolymers of two or more such olefins. As a non-limiting example, PP homo-polymer and PP plus PE co-polymer may be derived from the manufacture of PP resins either as a by-product stream(s) or as intermediate grades during the changeover form one grade to the next. These streams may be collected from the process and segregated into several qualities and which may be combined again to yield product that is suitable for specific asphalt applications either as such or in combination with the secondary rheology modifying agent described herein.

As a non-limiting embodiment, when manufactured as a compound, the resin or by-product wax content of the additive package may comprise in the range of 5% to 95% and preferably in the range of 50% to 85%. The Melting Point of the resin or by-product wax component is in the range of 120 C (248 F) to 200 C (392 F) and preferably in the range of 130 C (266 F) to 175 C (347 F).

In some non-limiting embodiment, the resin component may comprise a Needle Penetration at 77° F. in the range of 0 to 10 (units being 0.1 mm).

The resin component or primary rheology portion serves as a one component of the rheology/viscosity modifier and may also contribute to the overall binder stiffness at the pavement performance temperature as measured by the Dynamic Shear Rheometer.

Any suitable petroleum wax may be utilized in the present invention as desired. As a non-limiting example, the petroleum micro-wax may be derived from crude oil refining processes. One non-limiting example of a suitable petroleum was has a melting point in the range of 150° F. (66° C.) to 220° F. (104° C.). A combination of two or more separate micro-wax streams may also be used at times to achieve the desired effect. In some embodiments, the micro-wax may serve a dual purpose of viscosity modifier as well as to impart Low Temperature Performance flexibility to the asphalt binder and pavement mix.

The content of micro-wax in the additive package can be in the range of from 2, 5, 10, 15, 20, 30, 40, 50 60, 70 80 wt % to 50, 60, 70, 80, 90, 95, and 99 wt %. As non-limiting examples in the range of about 2 to 50 wt %, and in the range of 10 to 20 wt %.

In general, microcrystalline waxes are a type of wax produced by de-oiling petrolatum, as part of the petroleum refining process. In contrast to the more familiar paraffin wax which contains mostly unbranched alkanes, microcrystalline wax contains a higher percentage of isoparaffinic (branched) hydrocarbons and naphthenic hydrocarbons. It is characterized by the fineness of its crystals in contrast to the larger crystal of paraffin wax. It consists of high molecular weight saturated aliphatic hydrocarbons. It is generally darker, more viscous, denser, tackier and more elastic than paraffin waxes, and has a higher molecular weight and melting point. The elastic and adhesive characteristics of microcrystalline waxes are related to the non-straight chain components which they contain. Typical microcrystalline wax crystal structure is small and thin, making them more flexible than paraffin wax.

Microcrystalline waxes when produced by wax refiners are typically produced to meet a number of ASTM specifications. These include congeal point (ASTM D938), needle penetration (D1321), color (ASTM D6045), and viscosity (ASTM D445). Microcrystalline waxes can generally be put into two categories: "laminating" grades and "hardening" grades. The laminating grades typically have a melt point of 140-175 F and needle penetration of 25 or above. The hardening grades will range from about 175-200 F, and have a needle penetration of 25 or below. Color in both grades can range from brown to white, depending on the degree of processing done at the refinery level.

Microcrystalline waxes are derived from the refining of the heavy distillates from lubricant oil production. This by product then must be de-oiled at a wax refinery. The product then may have its odor removed and color removed (which typically starts as a brown or dark yellow). This is usually done by means of a filtration method or by hydro-treating the wax material.

A non-limiting example of a suitable crude oil derived micro-wax may have the following properties: Drop Melt Point (ASTM D 127) in the range of 150° F. (66° C.) to 220° F. (104° C.); and Kinematic Viscosity (ASTM D445) at 212° F. (100° C.) in the range 10 to 320 centi-stokes.

Any suitable Crude Tall Oil and Oxidized Tall Oil Pitch Component may be utilized in the present invention. As a non-limiting example, the crude tall oil and oxidized tall oil pitch component can be in the range of 2% to 20% of the formulation and preferably in the range of 2% to 10% of the formulation. The function of the oxidized tall oil pitch is as a dispersant for the resins so that it is evenly distributed in the final asphalt mixture to impart a consistent stiffness modulus to the asphalt binder as well as to the asphalt mix.

As used herein, including the claims, "tall oil materials" includes man made and naturally occurring tall oil, tall oil pitch, tall oil blends, and similar tall oil products. Tall oil is a liquid resinous material that may be obtained in the digestion of wood pulp from paper manufacture. Commercial tall oils comprise a complex of fatty acids, resin acids, sterols, higher alcohols, waxes and hydrocarbons. The acid components also may be present as the esters thereof.

A common source of tall oil that may be used in the practice of the present invention is from pine trees. Besides cellulose, tall oil contains fatty acids, esters, rosin acids, sterols, terpenes, carbohydrates and lignin. These may be separated when wood is converted to paper pulp by the sulfide or Kraft process. The acids may then be neutralized in an alkaline digestion liquor. The mixture of rosin and fatty acid soap may be recovered by subsequent acidification that releases free rosin and fatty acids, the major constituents of tall oil.

A non-limiting example of a suitable oxidized tall oil pitch may have the following properties: Softening Point in the range of 125° F. (52° C.) to 220° F. (104° C.); and Needle Penetration value at 25° C. in the range of 2 to 40 and preferably in the range of 5 to 20.

Some embodiments of the additive package of the present invention described herein may provide one or more of the following advantages over other Warm Mix products:

(a) Some non-limiting embodiments may be in the form of a one pack product that can be easily transported globally and handled to be added either to the asphalt binder and then to the aggregate mix as modified binder or it may be added directly to the aggregate mixing drum.

(b) In some non-limiting embodiments, the aggregate particles may be evenly coated with binder due to the lower surface tension imparted by the additive package to the binder. Also, the aggregate coated binder is not as sticky as conventionally mixed aggregate and this influences the workability of the aggregate mix and makes to less sticky onto transportation and paving equipment. Also, the compacted pavement may support traffic quickly without having any issues of stickiness onto traffic wheels.

(c) In some non-limiting embodiments, the high temperature PG (ie. the stiffness modulus) of the additive modified binder may be improved without or with little degrading of the Low Temperature PG.

(d) In some non-limiting embodiments, the additive may be detected and quantified in binder samples or aggregate mix samples or field core samples at any time during the life of the pavement and this is unlike most Warm Mix technologies that merely dissipate and can no longer be detected with passage of time.

Some embodiments of the present invention may incorporate one or more other Rheology Modifying Components. Non-limiting examples of such components may be as follows.

1. Polyethylene By-Product Waxes ("polyethylene waxes" or "PE waxes") in the melt Point range of 100 C to 160 C. The content of the by-product PE wax can be in the range of 5% to 50% and preferably 5% to 20%. The purpose of the by-product PE wax is as a dispersant for the resin component as well as viscosity modifier.

2. Fischer-Tropsch Hard Wax in the melting point range of 70 C to 115 C in the same content as described in (1) above.

3. SBS (styrene butadiene styrene), SB (styrene butadiene), SEBS (styrene ethylene butadiene styrene), SBR (stryrene butadiene rubber), Natural and Synthetic Latex, Crumb Tire Rubber and a polymer having glycidyl acrylate functionality, as a non-limiting example, Elvaloy Terpolymer, in the same content as described in (1) above. Elvaoly terpolymer is a commercially available ethylene-butyl acrylate (BA)-glycidyl methacrylate (GMA) terpolymer from DuPont, and may have compositions such as 28 wt % BA and 5.3 wt % GMA or 20 wt % BA and 9 wt % GMA (the balance being ethylene in both).

Trinidad Lake Asphalt (TLA), Gilsonite, Montan Waxes and natural Rubber in the same content as described in (1) above.

Petroleum micro waxes as described above.

A non-limiting example of the present invention includes first contacting the polymeric primary rheology modifying component and the dispersant secondary rheology modifying component together prior to adding either to the asphalt. As a non-limiting example, the polymer and the dispersant may both be melted and then thoroughly mixed together before being reformed into particles which may then be added to the asphalt. The melting may be accomplished separately with the melted materials then added together, or may be accomplished separately but simultaneously with the melted materials then added together, or may be accomplished simultaneously with the unmelted materials contacted together and then melted, or may be accomplished sequentially with the melted materials then added together, or may be accomplished by first melting one than contacting it with the unmelted one and then further melting of both. As another non-limiting example, polymer particles may be mixed into the melted dispersant with this mixture then formed into particles which may then be added to the asphalt. As even another non-limiting example, a dry mix of polymer particles and dispersant particles may first be formed, and this mix added directly to the asphalt, or the dry mix may then be melted and formed into particles which may then be added to the asphalt. As a further non-limiting example, the invention may also include use of a cross-linking pre-cursor is incorporated into the mixture to initiate active sites on the PP molecule chain and create a network structure in asphalt to give unique stiffness modulus properties, separation, stability and UV light protection. In the practice of the present invention, selected additives are chosen that are effective dispersing agents that partition between the PP molecules and thereby cause the PP to fall apart and disperse in asphalt binders. The polymer and dispersant may be formed into particles utilizing any suitable method/apparatus, including extrusion and subsequent cutting, pelletizing and the like. As a non-limiting embodiment, pellets may be formed from a mixture of a polyolefin and a wax (or in general from the primary rheology modifying component(s) and secondary rheology modifying component(s)). A melted mixture may be formed by melting the polyolefin and wax together in any desired order (i.e., sequentially melting one and then melting the other and then mixing, sequentially melting one and then mixing with the other unmelted and then melting the mixture, simultaneously apart and then mixing, simultaneously together, or any other suitable order/arrangement). A solid form of the additive, non-limiting examples of which include particles, pellets, pills, powder, pastilles, beads, granules, or the like may be formed by any suitable method with any suitable apparatus including extrusion, pelletizing, cutting, chopping and the like.

In even another non-limitng embodiment pellets may be formed from a mixture of a polyethylene homopolymer, polypropylene homopolymer or polypropylene/polyethylene copolymer and a wax (or in general from the primary rheology modifying component(s) and secondary rheology modifying component(s)). A melted mixture may be formed by melting the polymer and wax together in any desired order (i.e., sequentially melting one and then melting the other and then mixing, sequentially melting one and then mixing with the other unmelted and then melting the mixture, simultaneously apart and then mixing, simultaneously together, or any other suitable order/arrangement). Particles, pellets, pills, powder, pastilles, beads, granules or the like may be formed by any suitable method with any suitable apparatus including extrusion, pelletizing, cutting, chopping and the like.

In still another non-limiting embodiment pellets may be formed from a mixture of a polypropylene homopolymer or polypropylene/polyethylene copolymer, and a polyethylene wax or a petroleum micro wax (or in general from the primary rheology modifying component(s) and secondary rheology modifying component(s)). A melted mixture may be formed by melting the polymer and wax together in any desired order (i.e., sequentially melting one and then melting the other and then mixing, sequentially melting one and then mixing with the other unmelted and then melting the mixture, simultaneously apart and then mixing, simultaneously together, or any other suitable order/arrangement). Particles, pellets, pills, powder, pastilles, beads, granules or the like may be formed by any suitable method with any suitable apparatus including extrusion, pelletizing, cutting, chopping and the like. In some non-limiting embodiments the binder may comprise a polyethylene wax. In some non-limiting embodiments the binder may comprise a petroleum micro wax.

It is believed that any known asphalt composition or product may be made using the additives of the present invention to replace part or all of the petroleum based asphalt binder therein. Non-limiting examples include blown asphalt and straight asphalt. As a non-limiting example, a paving application may be formed utilizing a straight asphalt. The known equipment and methods of making the known asphalt compositions and products are believed to be sufficient for making the asphalt compositions and products of the present invention in which part or all of the petroleum based asphalt has been partially or wholly replaced by modified asphalt of the present invention.

In addition to the above embodiments, the present invention may also include the following non-limiting embodiments.

Non-limiting embodiments of the present invention include a one product additive package formulation for asphalt modification which comprises PP homo-polymer (or in general any of the primary rheology modifying component(s)) plus PE by-product wax and/or petroleum micro-wax and/or CTO and/or Oxidized Tall Oil Pitch and/or any of the Other Rheology Modifying Agents above. In some embodiments, the additive may increase the useful performance temperature range of the asphalt binder which may already be modified or not.

Non-limiting embodiments of the present invention include the additive package described above which may be used as the Warm Mix Asphalt Paving concept.

Non-limiting embodiments of the present invention include the additive package described above and which may be used in roofing applications.

Non-limiting embodiments of the present invention include the PE Wax described above that is derived as a byproduct wax from polyethylene manufacture in the Softening Point range of 215° F. (102° C.) to 275° F. (135° C.), Needle penetration value at 25° C. in the range of 2 to 10 and Brookfield Viscosity at 300° F. in the range of 15 to 300 cps.

Non-limiting embodiments of the present invention include the Petroleum Micro-Wax described in the invention above that is derived from crude oil refining and has a Drop Melt Point (ASTM D127) in the range of 150° F. (66° C.) to 220° F. (104° C.) and Kinematic Viscosity (ASTM D445) at 212° F. (100° C.) in the range of 10 to 320 Centi-Stokes.

Non-limiting embodiments of the present invention include the oxidized tall oil pitch described above with a Softening Point in the range of 125° F. (52° C.) to 220° F. (104° C.).

Non-limiting embodiments of the present invention include the additive package described above used with neat asphalt binder or with polymer modified binder (including modified asphalt that has been modified with any of Styrene Butadiene Styrene, Styrene Butadiene Rubber, Natural Latex Rubber, Synthetic Latex Rubber, Crumbed Tire Rubber, Ethylene Vinyl Acetate, Terpolymers, and Atactic Polypropylene).

Non-limiting embodiments of the present invention include the additive package above used in roofing applications (including shingles, rolls, mop on grades, adhesives and sealants) to reduce working temperatures and enhance workability.

Non-limiting embodiments of the present invention include the additive package described above used in hot applied surface dressings including chip seals, slurry seals, joint sealants, crack sealants, etc.

Non-limiting embodiments of the present invention include a Warm Mix asphalt mix formulation for the pavement of road surfaces where the formulation comprises of a mixture of bitumen and aggregates and between 0.2 to 30% by weight of the additive package based on weight of the asphalt binder content.

Non-limiting embodiments of the present invention include the formulation of above wherein the temperature of compaction of the aggregate mix is 10° F. to 90° F. below conventional Hot Mix asphalt.

Non-limiting embodiments of the present invention include the asphalt formulation above where the additive package may be added to the drum mixer or batch mixer directly or added to the asphalt binder and then introduced into the drum mixer or batch mixer as additive modified binder.

Non-limiting embodiments of the present invention include the Warm Mix asphalt of above wherein the additive package is added to produce a Warm Mix aggregate, and also include embodiments wherein the individual components of the additive package are added to produce the Warm Mix aggregate.

Non-limiting embodiments of the present invention include the additive package described above for use in co-extrusion with polymers and wax additives to render these more easily dispersible in asphalt binders. These co-extrusion components may be any of the primary and/or secondary rheology modifying components mentioned above.

Non-limiting embodiments of the present invention include the use of the any of the present invention for asphalt modification for Pavement and Roofing applications.

The additives of the present invention may be formed by a wide variety of methods utilizing a wide variety of apparatus. All of the additives herein may be utilized in combination with ground tire rubber (GTR) or any recycled rubber material. In some embodiments, it is necessary to stabilize the GTR in asphalt, which may be accomplished by the addition of the above described reactive elastomeric terpolymer, and/or with the above described polymers having a glycidyl or glycidyl acrylate functionality, a non-limiting example of such functionality includes glycidyl methacrylate functionality, and a non-limiting example of such a polymer includes ethylene-butyl acrylate-glycidyl methacrylate terpolymer (a commercial example of which is Elvaloy terpolymer available from DuPont). Further, it is believed that any of the polymers mentioned herein as suitable as the primary rheology modifying component may be functionalized with glycidyl or glycidyl acrylate (including glycidyl methacryalate, and glycidyl ethacrylate functionality). In some embodiments, the secondary rheology modifying component is not necessary to stabilize ground tire rubber in asphalt.

As explained above, the stability of GTR in asphalt is generally determined by the Separation test ('cigar tube test') ASTM D 7173; Determining Separation Tendency of Polymer from Polymer Modified Asphalt. The closer the temperature between the top and the bottom of the cigar tube, the higher the stability. SBS is regarded as the gold standard benchmark for modifying asphalt, with SBS modified asphalt having a cigar test of 2° C. (3.6° F.) difference. In sharp contrast, GTR modified asphalt will have a 30° F. (16.7° C.) difference or worse. Various embodiments of the present invention provide for stabilizing GTR modified asphalt with the additives of the present invention so that the cigar test temperature difference for the GTR modified asphalt is greatly improved When the additives of the present invention are utilized in making GTR modified asphalt, or otherwise incorporated into GTR modified asphalt, the cigar test results are a lot better than 30° F. (16.7° C.) difference, specifically less than or equal to 14° C. (25.2° F.), 12° C. (21.6° F.), 10° C. (18° F.), 8° C. (14.4° F.), 6° C. (10.8° F.), 4° C. (7.2° F.), 2° C. (3.6° F.), 1° C. (1.8° F.), or 0.5° C. (0.9° F.) temperature difference using ASTM D 7173. In other words, the additives of the present invention stabilize GTR in asphalt so that the GTR modified asphalt now meets the SBS gold standard regarding the cigar test of 2° C. (3.6° F.). In some embodiments, the additive may not require the secondary rheology modifying component to stabilize the ground tire rubber in asphalt.

As one non-limiting embodiment, the primary rheology modifying component(s) and the secondary rheology modifying component(s) may be melted together into a molten liquid phase, mixed, and then formed into solid form which is now useful as an asphalt additive. As a specific non-limiting example of this embodiment, melt wax, polymers, and Elvaloy® terpolymer, mix and form solid additive. As another specific non-limiting example of this embodiment, melt wax and Elvaloy® terpolymer, mix and form solid additive.

As a more specific non-limiting embodiment of the above embodiment, the primary rheology modifying component(s) and the secondary rheology modifying component(s) may be melt mixed via extrusion, with the extrudate made into solid form which is now useful as an asphalt additive. As a specific non-limiting example of this embodiment, melt mix via extrusion the polymers, wax and Elvaloy® terpolymer, next form the extrudate into the solid additive.

As another non-limiting embodiment, the primary rheology modifying component(s) and the secondary rheology modifying component(s) may be melted together into a molten liquid phase, mixed, and then formed into solid form. This additive in solid form may be combined with additional primary rheology modifying component(s) and/or secondary rheology modifying component(s) and utilized as an asphalt additive. It should be appreciated the formed solid additive and additional rheology modifying component(s) may be combined prior to contacting with asphalt, added to asphalt simultaneously, or added to asphalt consecutively. As a specific non-limiting example of this embodiment, melt wax and polymers mix and form into pellets, then combine these pellets with Elvaloy pellets in the asphalt blend tank.

Some embodiments of the present invention will melt the primary and secondary rheology modifying components together at the same time. Other embodiments will first melt the primary rheology modifying component(s), and then introduce the secondary rheology modifying component(s) to the melted primary rheology modifying component(s). The secondary rheology modifying component(s) may or may not be melted at the time of the introduction. As a non-limiting example, utilizing a twin screw extruder, the primary rheology modifying component(s) (as a non-limiting example a PAO and an Elvaloy terpolymer) are introduced at the front end of the extruder. The secondary rheology modifying component may be introduced at the front end of the extruder along with the primary rheology modifying component(s) (as a non-limiting example a wax) or may be introduced after the front end of the extruder (generally at the end of the first screw/beginning of the second screw) to join the already melted primary rheology modifying component(s).

As a more specific non-limiting embodiment of the above embodiment, the primary rheology modifying component(s) and the secondary rheology modifying component(s) may be melt mixed via extrusion, with the extrudate then formed into solid form. This additive in solid form may then be combined with additional primary rheology modifying component(s) and/or secondary rheology modifying component(s) and utilized as an asphalt additive. It should be appreciated the formed solid additive and additional rheology modifying component(s) may be combined prior to contacting with asphalt, added to asphalt simultaneously, or added to asphalt consecutively. As a specific non-limiting example of this embodiment, melt mix the polymers and wax via extrusion, then pelletize the extrudate, then combine these pellets with Elvaloy® terpolymer in the asphalt blend tank.

As even another non-limiting embodiment, the primary rheology modifying component(s) and the secondary rheology modifying component(s) may be micronized via high shear grinding to form the asphalt additive. As a specific non-limiting example of this embodiment micronize via high shear grinding polymer, wax and Elvaloy to form the asphalt additive. The components may be combined before the high shear grinding and subjected to the grinding together, or may be subjected to the grinding separately and combined afterwards.

As even another non-limiting embodiment, the asphalt additive may be formed by micronizing the primary rheology modifying component(s) via high shear grinding, without the need for the secondary rheology modifying component(s). It is believed that the micronized primary rheology modifying component(s) will sufficiently disperse in asphalt without the need for the secondary rheology modifying component. As a specific non-limiting example of this embodiment, would include micronizing Elvaloy® terpolymer and adding to the asphalt blend tank.

Should more than one primary rheology modifying component and/or secondary rheology modifying component be micronized, the components may be combined before micronizing and subjected to micronizing together, or may be subjected to micronizing separately and combined afterwards, or added simultaneously or sequentially to the asphalt after micronizing.

Any suitable micronizing method and apparatus may be utilized to form the micronized additive of the present invention. Common traditional micronization techniques are based on friction to reduce particle size, and such methods include milling, bashing and grinding. A typical industrial mill is composed of a cylindrical metallic drum that usually contains steel spheres. As the drum rotates the spheres inside collide with the particles of the solid, thus crushing them towards smaller diameters. In the case of grinding, the solid particles are formed when the grinding units of the device rub against each other while particles of the solid are trapped in between. Methods like crushing and cutting are also used for reducing particle diameter, but produce more rough particles compared to the two previous techniques (and are therefore the early stages of the micronization process). Crushing employs hammer-like tools to break the solid into smaller particles by means of impact. Cutting uses sharp blades to cut the rough solid pieces into smaller ones. There are also cryogenic techniques for micronizing. For example, some methods use supercritical fluids in the micronization process. The most widely applied techniques of this category include the RES S process (Rapid Expansion of Supercritical Solutions), the SAS method (Supercritical Anti-Solvent) and the PGSS method (Particles from Gas Saturated Solutions).

Another embodiment of the present invention provides for the dispersion of the primary rheology modifying component(s) by first micronizing those components which allows for dispersion of those components into asphalt without the need for the secondary rheology modifying component(s). In general additive particles of the present invention will be dispersible in asphalt if an effective amount of the particles to modify the asphalt have a diameter less than about 590, 420, 297, 250, 177, 149, 74, 37, or 15 μm (microns), or will pass through a mesh size of 30, 40, 50, 60, 80, 100, 200, 400, or 800 mesh.

Some embodiments of the present invention favor utilizing additive with glycidyl functionality, glycidyl acrylate functionality, or epoxide functionality for modifying asphalts with higher asphaltene content, while other embodiments favor utilizing additive with polyolefin(s) (PAO's) for modifying asphalts with lower asphaltene content. Generally, low asphaltene asphalts will have in the range of about 3 to 5 wt % asphaltene content (or less) whereas high asphaltene asphalts will have in the range of about 12 to 15 wt % asphaltene content (or more). The should be considered a continuum, with those asphalts with asphaltene content in the middle (i.e, between 5 and 12 wt %), utilizing an additive having a mixture.

Some non-limiting embodiments of the present invention provide for methods of modifying a petroleum asphalt, the method comprising: combining the petroleum asphalt with an additive to form a modified asphalt, wherein the additive comprises ground tire rubber and resin, wherein the resin is selected from the group consisting of reactive elastomeric terpolymers, polymers having glycidyl functionality, polymers having glycidyl acrylate functionality, and polymers having epoxide functionality.

EXAMPLES

For the Examples "Rheopave 10 XP" (also referred to as Rheopave XP 10) is a melt blended mixture of a wax, polypropylene homopolymer and a functionalized polymer containing glycidyl methacrylate functionality (Elvaloy terpolymer) in solid form. "Rheopave 100" is a melt blended mixture of a wax and polypropylene homopolymer in solid form.

For the Examples, production of Rheopave products involve melt blending via extrusion for complete dispersion of the components which are wax, PP homopolymer and Elvaloy 4170 for Rheopave 10XP (no Elvaloy in Rheopave 100). The resulting Rheopave product is in the physical form of pellets. The Rheopave pellets are added to hot asphalt base in a stirred vessel at 375 DEG F. and stirred for one hour after addition. The resultant modified asphalt is then cooled and the various standardized laboratory tests are performed according to standard procedures. Rheopave 10XP is generally PP with MFR 20 (35 wt %), Elvaloy 1117 (50 wt %), and CWP 500 PE Wax (15 wt %). Rheopave 100 is generally PP (70 wt %) and wax (30 wt %).

Example 1

Supporting data for asphalt modifier patent based on polypropylene homo-polymer and polypropylene plus polyethylene co-polymer as primary rheology agents and specified secondary rheology modifying agents.

TABLE 1

|  | Method | Base Asphalt | Base Asphalt plus 4% Additive A | Base Asphalt plus 4% Additive B |
|---|---|---|---|---|
| Continuous PG Grade |  | 68.4-24.2 | 78.9-23.03 | 75.3-23.69 |
| Rotational Visco. at 270 F., cps | TP 48 |  |  |  |
| Rotational Visco. at 300 F., cps | TP 48 |  |  |  |
| Rotational Voisc. at 135 C., cps | TP 48 | 0.56 | 1280.00 | 1030 |
| Dynamic Shear Rheometer: | T315 |  |  |  |
| Temperature Pass, C. |  | 67.00 | 76.00 | 70.00 |
| Phase Angle |  |  | 68.10 | 82.00 |
| G* at 10 rad/sec, kPa. |  |  | 1.62 | 1.76 |
| G*/sin delta at 10 rad/sec., kPa. |  | 1.27 | 1.74 | 1.77 |
| Temperarure Fail, C. |  | 69.00 | 82.00 | 76.00 |
| Phase Angle |  |  | 64.80 | 83.80 |
| G* at 10 rad/sec, kPa. |  |  | 1.00 | 0.93 |
| G*/sin delta at 10 rad/sec., kPa. |  |  | 1.10 | 0.94 |
| Pass/Fail, Temp. C. |  |  | 83.10 | 75.30 |
| RTFO Residue Tests: |  |  |  |  |
| Mass Loss, % | T240 | 0.06 | 0.27 | −0.26 |
| Dynamic Shear Rheometer | T315 | 2.62 |  |  |
| Temperature Pass, C. |  | 68.40 | 76.00 | 70.00 |
| Phase Angle |  |  | 73.30 | 76.80 |
| G* at 10 rad/sec, kPa. |  |  | 2.83 | 4.76 |
| G*/sin delta at 10 rad/sec., kPa. |  |  | 2.95 | 4.83 |
| Tempersture Fail, C. |  |  | 82.00 | 76.00 |
| Phase Angle |  |  | 74.00 | 79.20 |
| G* at 10 rad/sec, kPa. |  |  | 1.55 | 2.35 |
| G*/sin delta at 10 rad/sec., kPa. |  |  | 1.60 | 2.39 |
| Temperature Pass/Fail, C. |  |  | 78.90 | 76.70 |
| PAV Residue Tests: |  |  |  |  |
| Dynamic Shear Rheometer | T315 |  |  |  |
| Temperature, C. |  | 25.00 | 28.00 | 28.00 |
| Phase Angle |  |  | 43.00 | 41.90 |
| G* at 10 rad/sec, kPa. |  |  | 2590.00 | 3860.00 |
| G*/sin delta at 10 rad/sec., kPa. |  |  | 1770.00 | 2580.00 |
| Bending Beam Rheometer | T313 |  |  |  |
| Temperature Pass, C. |  | −12.00 | −12.00 | −12.00 |
| Stiffness, 60 s, Mpa |  | 104.00 | 142.00 | 147.00 |
| M-value, 60 s |  | 0.35 | 0.31 | 0.31 |
| Temperature Fail, C. |  |  | −18.00 | −18.00 |
| Stiffness, 60 s, Mpa |  |  | 283.00 | 300.00 |
| M-value, 60 s |  |  | 0.27 | 0.27 |

Additional Dynamic Shear Rheometer (DSR) Data Demonstrating Effectiveness of PP Compounds in High Temperature Performance Grading

| Sample Reference | Composition, % m/m of Additive | G* | G*/Sind | Phase Angle Degrees | Test Temperature, C. |
|---|---|---|---|---|---|
| Base Valero PG 67-22 |  | 1.00 | 1.01 | 84.2 | 67 |
| 3% SB2 in V67-22 | 85% PP (stream 1) plus 15% PE Wax | 0.73 | 0.75 | 75.8 | 82 |
|  |  | 1.28 | 1.31 | 76.5 | 76 |
| 4% SB2 in V67-22 | 85% PP (stream1) plus 15% PE Wax | 1.42 | 1.49 | 72.0 | 82 |
| 6% SB2 in V67-22 | 85% PP (stream1) plus 15% PE Wax | 1.14 | 1.26 | 64.5 | 88 |
| 3% SB3 in V67-22 | 85% PP (stream 2) plus 15% PE Wax | 0.84 | 0.85 | 82.5 | 76 |
|  |  | 1.64 | 1.66 | 81.3 | 70 |
| 3% SB4 in V67-22 | 85% PP (stream 2) plus PE Wax | 0.81 | 0.82 | 84.4 | 76 |
|  |  | 1.66 | 1.67 | 83.0 | 70 |
| 3% SB5 in V67-22 | 100% PP (Stream 2) | 0.87 | 0.88 | 84.0 | 76 |
|  |  | 1.76 | 1.78 | 82.6 | 70 |
| 3% SB6 in V67-22 | 42.5% PP Wax Stream 1) plus 42.5% PP Wax (stream 2) plus 15% PE Wax | 0.97 | 0.98 | 82.5 | 76 |
|  |  | 1.95 | 1.97 | 81.4 | 70 |

Notes:
1. Additive A = 85% Resin plus 15% PE By-Product Wax and Continuous PG grade escalated from PG 68.4-24.2 to PG 78.9-23.03. This represents binder PG improvement of 2 full grades.
2. Additive B = 80% Resin plus 20% Micro-Wax and Continuous PG grade escalated from PG 68.4-24.2 to PG 75.3-23.9. This represents a full one PG improvement in binder grade. A marginal incresae in Additive B will meet the PG 76-22 Grade.
3. Unlike Fischer-Tropsch Waxes and other Plastomeric additives, the Low temperature grading is not negatively impacted.
4. The Rotational Viscosity of the modified Asphalt blends are less than 50% of the specified maximum viscosity of 3,000 cps at 135 C. This substantial lower viscosity will reduce the viscosity of the aggregate mix in a corresponding manner and will result in Warm Mix Asphalt benefits.

Example 2

The follow data shows PP compound (Rheopave 100) improving the separation stability in Crumbed Rubber Asphalt formulations

TABLE 2

| BLEND | CIGAR TUBE TOP | CIGAR TUBE BOTTOM | ORIGINAL DSR @ 76° C. | RV @ 300° F. |
|---|---|---|---|---|
| 10% GTR MESH 80 IN V67-22 | 139.4° F. | 163.5° F. | — | — |
| 10% GTR MESH 80 IN V67-22 + 1% RHEOPAVE 100 | 151.5° F. RETEST: 150.7° F. | 153.5° F. RESTES: 152.9° F. | — | — |
| 10% GTR MESH 40 IN V67-22 | 135.1° F. | 161.6° F. | — | — |
| 10% GTR MESH 40 IN V67-22 + 1% SBS | 145.7° F. | 160.0° F. | G * Sin($\delta$) = 2.33 KPa Phase Angle = 75.6° | 1740 cps |
| 10% GTR MESH 40 IN V67-22 + 1% RHEOPAVE 100 | 150.1° F. | 149.5° F. | G * Sin($\delta$) = 2.07 KPa Phase Angle = 77.4° | 1550 cps |
| 10% GTR MESH 40 IN V67-22 + 0.5% RHEOPAVE 100 | 140.0° F. | 163.2° F. | G * Sin($\delta$) = 1.91 KPa Phase Angle = 79.0° | 1445 cps |
| 10% GTR MESH 40 IN V67-22 + 0.5% SBS + 0.5% RHEOPAVE 100 | 149.4° F. | 150.3° F. | G * Sin($\delta$) = 2.39 KPa Phase Angle = 76.3° | 1630 cps |
| SFMC ARB-5 | 126.0° F. | 145.0° F. | — | 550 cps |
| SFMC ARB-5 + 0.5% RHEOPAVE 100 | 130.1° F. | 145.5° F. | — | — |
| SFMC ARB-5 + 1% RHEOPAVE 100 | 136.0° F. | 138.8° F. | — | 795 cps |

Example 3

TABLE 3

| | Hamburg Wheel | | | | | |
|---|---|---|---|---|---|---|
| | Rut Depth @ 20,000 Passes, mm | | | Total Passes to 12.5 mm Rut Depth | | |
| Mix Type | Sample 1 | Sample 2 | Average | Sample 1 | Sample 2 | Average |
| PG 76-22 | 6.392 | 5.549 | 5.971 | 95,130 | 173,593 | 134,362 |
| GTR | 8.792 | 9.727 | 9.260 | 54,328 | 49,580 | 51,954 |

Based upon the Hamburg testing criteria set forth by the Texas Department of Transportation, shown in Table 4, both samples meet the Hamburg criteria for a PG 76 and above high temperature grade. Stripping inflection points were not observed for either mixture.

TABLE 4

| High Temperature Binder Grade | Minimum # of Passes @ 12.5 mm Rut Depth, Tested @ 122° F. |
|---|---|
| PG 64 or Lower | 10,000 |
| PG 70 | 15,000 |
| PG 76 or Higher | 20,000 |

Example 4

TABLE 5 provides the results of a 10% GTR FORMULATION IN 67-22, subjected to various testing.

| Project Title/Specs: | 10% GTR FORMULATION IN 67-22 | | |
|---|---|---|---|
| Rheopave 10 XP at 0.5% | Sample 1 | Sample 2 | Specification |
| Sample ID | BASE 67-22 | AWI-GAT 10% GTR FORMULA* | |
| Continuous PG Grade | 69.0 - 23.1 | 80.8 - 22.4 | 76 - 22 |
| Full PG | 67 - 22 | 76 - 22 | 76 - 22 |
| Original Binder Tests: | | | |
| Rotational Viscosity, 135 C., cps | — | 2600.0 | <3000 |
| Softening Point, F. | — | 146.2 | |

-continued

| Project Title/Specs: | | 10% GTR FORMULATION IN 67-22 | | |
|---|---|---|---|---|
| Rheopave 10 XP at 0.5% | | Sample 1 | Sample 2 | Specification |
| Dynamic Shear Rheometer | T 315 | | | |
| | Continuous PG | 69.0 | 83.5 | >76 |
| | Temp Pass | 64 | 82 | |
| Phase Angle, degrees | | 86.2 | 76.8 | |
| G* @10 rad/sec, kPa | | 1.830 | 1.11 | |
| G*/sin delta @10 rad/sec, kPa | | 1.830 | 1.14 | |
| Phase Angle, degrees | Temp Fail | 70 | 88 | |
| | | 87.7 | 80.1 | |
| G* @10 rad/sec, kPa | | 0.880 | 0.649 | |
| G*/sin delta @10 rad/sec, kPa | | 0.880 | 0.659 | |
| | | RTFO Residue Tests: | | |
| MSCR, 64 C., Jnr @ 3.2 kPa | | 1.973 | 0.354 | <1.0 |
| % Rec. @ 3.2 kPa | | 2.62% | 40.97% | >35% |
| Diff in Jnr @ 3.2 kPa | | 9.56% | 28.17% | <75% |
| Dynamic Shear Rheometer | T 315 | | | |
| | Continuous PG | 69.9 | 80.8 | >76 |
| | Temp Pass | 64 | 76 | |
| Phase Angle, degrees | | 82.1 | 69.3 | |
| G* @10 rad/sec, kPa | | 4.67 | 3.27 | |
| G*/sin delta @10 rad/sec, kPa | | 4.71 | 3.49 | |
| | Temp Fail | 70 | 82 | |
| Phase Angle, degrees | | 84.4 | 72.3 | |
| G* @10 rad/sec, kPa | | 2.17 | 1.87 | |
| G*/sin delta @10 rad/sec, kPa | | 2.18 | 1.96 | |
| | | PAV Residue Tests: | | |
| Dynamic Shear Rheometer | T 315 | | | |
| | Temp Pass | — | 31 | |
| Phase Angle, degrees | | — | 48.7 | |
| G* @10 rad/sec, kPa | | — | 1450 | |
| G*sin delta @ 10 rad/sec, kPa | | — | 1090 | <5000 |
| Bending Beam Rheometer | T 313 | | | |
| | Temp Pass | −12 | −12 | |
| s, 60 s, Mpa | | 185 | 112 | <300 |
| M-value, 60 s | | 0.310 | 0.314 | >0.300 |
| | Temp Fail | −18 | −18 | |
| s, 60 s, Mpa | | 391 | 214 | |
| M-value, 60 s | | 0.253 | 0.260 | |

Notes:
*10% 40 Mesh GTR + 0.50% Rheopave XP10A + 1% Hydrogreen in 67-22

Example 5

TABLE 6 is a comparison of PG64-22 TO PG76-22TR RHEOPAVE XP10 VS. VESTENAMER 8021 (a cyclo octene polymer), with both subjected to various testing.

| Project Title/Specs: | PG64-22 TO PG76-22TR RHEOPAVE XP10A VS. VESTENAMER - MAY 2013 | Sample 1 | Sample 2 | Sample 3 | Sample 4 |
|---|---|---|---|---|---|
| Sample1 ID | | 400TR + 1% RHEOPAVE XP10 | 400TR + 1% VESTENAMER | 30AA + 1% RHEOPAVE XP10 | 30AA + 1% VESTENAMER |
| Continuous PG Grade | | 80.1 − 23.8 | 80.7 − 19.3 | 79.8 − 23.3 | 80.7 − 24.2 |
| Full PG | | 76 − 22 | 76 − 16 | 76 − 22 | 76 − 22 |
| | | Original Binder Tests: | | | |
| Rotational Visc, 135 C., cps | | 4338 | 4200 | 3850 | 3612 |
| CG Top/Bottom, F. | | | | | |

| Project Title/Specs: | PG64-22 TO PG76-22TR RHEOPAVE XP10A VS. VESTENAMER - MAY 2013 | Sample 1 | Sample 2 | Sample 3 | Sample 4 |
|---|---|---|---|---|---|
| Dynamic Shear Rheometer | T 315 | | | | |
| | Continuous PG | 83.7 | 83.4 | 83.1 | 83.3 |
| | Temp Pass | 82 | 76 | 82 | 82 |
| Phase Angle, degrees | | 74.2 | 75.1 | 74.3 | 74.3 |
| G* @10 rad/sec, kPa | | 1.12 | 1.98 | 1.06 | 1.94 |
| G*/sin delta @10 rad/sec, kPa | | 1.16 | 2.05 | 1.100 | 2.02 |
| | Temp Fail | 88 | 82 | 88 | 82 |
| Phase Angle, degrees | | 77.3 | 78.5 | 77.4 | 77.6 |
| G* @10 rad/sec, kPa | | 0.667 | 1.11 | 0.638 | 1.10 |
| G*/sin delta @10 rad/sec, kPa | | 0.684 | 1.13 | 0.654 | 1.13 |
| | RTFO Residue Tests: | | | | |
| MSCR, 64 C., Jnr/% Rec | | 0.331/47.40% | 0.441/33.36% | 0.403/41.84% | 0.449/30.34% |
| Dynamic Shear Rheometer | T 315 | | | | |
| | Continuous PG | 80.1 | 80.7 | 79.8 | 80.7 |
| | Temp Pass | 76 | 76 | 76 | 76 |
| Phase Angle, degrees | | 67.0 | 69.9 | 66.1 | 69.4 |
| G* @10 rad/sec, kPa | | 2.90 | 3.29 | 2.79 | 3.24 |
| G*/sin delta @10 rad/sec, kPa | | 3.15 | 3.50 | 3.05 | 3.46 |
| | Temp Fail | 82 | 82 | 82 | 82 |
| Phase Angle, degrees | | 69.0 | 73.1 | 68.5 | 72.6 |
| G* @10 rad/sec, kPa | | 1.73 | 1.86 | 1.69 | 1.85 |
| G*/sin delta @10 rad/sec, kPa | | 1.86 | 1.95 | 1.82 | 1.94 |
| | PAV Residue Tests: | | | | |
| | Temp Pass | −6 | −12 | −6 | −12 |
| s, 60 s, Mpa | | 46 | 117 | 53 | 99 |
| M-value, 60 s | | 0.361 | 0.285 | 0.360 | 0.310 |
| | Temp Fail | −12 | −18 | −12 | −18 |
| s, 60 s, Mpa | | 107 | 200 | 113 | 197 |
| M-value, 60 s | | 0.314 | 0.252 | 0.311 | 0.283 |

Notes:
Formulas are all 10% GTR + 1% Vestenamer/Rheopave XP10A
Additive A blends meet all Georgia requirements except RV @ 135 C.
Vestenamer blends:
400TR - Does not meet RV @ 135 C., phase angle, MSCR and BBR
30AA - Does not meet RV @ 135 C., and MSCR

Example 6

Referring now to FIG. 1, there is provided TABLE 7, Separation Test Results for Test Highway using Rheopave 10XP. The evaluating state DOT noted the workability and compaction of the Rheopave mix and which was superior to usual Asphalt Rubber Binder Mixes.

Example 7

Table 8 provides various test results for 82-22 ARB binder.

TABLE 8

82-22 ARB BINDER.

| Physical Properties | LTRC Results | | | |
|---|---|---|---|---|
| (Tests) | Sample # 1 | Sample # 2 | Sample # 3 | AVG |
| Rotational Viscosity @ 135° C. (Pa · s) | — | — | — | 3.16 |
| Original DSR @ 82° C. (G*/Sinδ) | 1.74 | 1.78 | — | 1.76 |
| Original DSR- Phase Angle @ 82° C. | 76.5 | 76.2 | — | 76.4 |
| RTFO DSR @ 82° C. (G*/Sinδ) | 3.88 | 3.83 | — | 3.86 |
| RTFO DSR- Phase Angle @ 82° C. | 67.0 | 67.3 | — | 67.2 |
| % Elastic Recovery @ 25° C., 10 cm elongation | 64.0 | 64.0 | — | 64.0 |
| MSCR % $R_{3.2}$ @ 64° C. | 59.250 | 59.218 | — | 59.234 |
| MSCR $J_{nr, 3.2}$ @ 64° C. | 0.105 | 0.109 | — | 0.107 |
| MSCR % $R_{3.2}$ @ 67° C. | 52.017 | 51.719 | — | 51.868 |

TABLE 8-continued 82-22 ARB BINDER.

| Physical Properties | LTRC Results | | | |
|---|---|---|---|---|
| (Tests) | Sample # 1 | Sample # 2 | Sample # 3 | AVG |
| MSCR J$_{nr, 3.2}$ @ 67° C. | 0.173 | 0.181 | — | 0.177 |
| PAV DSR @ 25° C. (G * Sinδ) | 2470 | 2570 | — | 2520 |
| PAV DSR- Phase Angle @ 25° C. | 41.4 | 41.0 | — | 41.2 |
| BBR Creep Stiffness, S, Mpa @ −12° C. | 109 | 112 | 103 | 108 |
| BBR Creep Slope, m Value @ −12° C. | 0.311 | 0.313 | 0.310 | 0.311 |

Example 8

Referring now to FIG. 2, there is provided TABLE 9, showing various test results for PG67-22 Base Asphalt Upgraded to PG76-22 GTR with MSCR Specification.

Example 9

TABLE 10 provides various test results for PG67-22 Base Asphalt Upgraded to PG 76-22 GTR with MSCR Specification.

TABLE 10

PG67-22 Base Asphalt Upgraded to PG
76-22 GTR with MSCR Specification

| Property | 9% GTR Formula with Rheopave 10 XP | Target |
|---|---|---|
| RV at 135 C. (cP) | 2850 | 3000 Max |
| Original DSR at 76 C. | | |
| Phase Angle (Deg) | 71.6 | <75 |
| G*/Sin (kPa) | 1.97 | Min 1.0 |
| RTFO DSR at 76 C. | | |
| Phase Angle (Deg) | 63.5 | |
| G*Sin (kPa) | 4.83 | Min 2.2 |
| Fail Temp (Deg C.) | 85.1 | Min 76 |
| PAV DSR at 76 C. | | |
| Phase Angle | 44.1 | |
| MSCR at 64 C. Jnr/% Rec | 0.208/62.98% | % Rec >50% |
| BBR at −12 Deg C. | | |
| Tm Value (Mpa) | 0.334 | Min 0.30 |
| Stiffness (Mpa) | 152 | Max 300 |
| BBR at −18Deg C. | | |
| m-Value (Mpa) | 0.283 | Min 0.30 |
| Stiffness (Mpa) | 273 | Max 300 |
| Continuous PG: | 83.4-26.0 | 76-22 |
| PG Grade: | 82-22 | 76-22 |

Example 10

Referring now to FIG. 3 there is provided TABLE 11 showing testing date for the PG (ARB)-22 TEST SECTION completed for a state DOT, and also to FIGS. 4A and 4B providing Table 12 (Parts 1 and 2), and to FIGS. 5A and 5B (Providing Table 13 (Parts 1 and 2), showing certification for the Rheopave modified asphalt. The evaluating state DOT noted the workability and compaction of the Rheopave mix and which was superior to usual Asphalt Rubber Binder Mixes.

The present disclosure is to be taken as illustrative rather than as limiting the scope or nature of the claims below. Numerous modifications and variations will become apparent to those skilled in the art after studying the disclosure, including use of equivalent functional and/or structural substitutes for elements described herein, use of equivalent functional couplings for couplings described herein, and/or use of equivalent functional actions for actions described herein. Any insubstantial variations are to be considered within the scope of the claims below.

The invention claimed is:

1. An asphalt comprising:
   a first component comprising a low asphaltene petroleum asphalt having an asphaltene content in the range of about 3 to 5 wt %; and,
   a second component comprising particles of polypropylene resin; wherein the resin particles have a diameter less than about 590 microns.

2. The asphalt of claim 1, further comprising glycidyl functional terpolymers, a wax, and ground tire rubber.

3. The asphalt of claim 1, further comprising a wax, ground tire rubber and at least one of reactive elastomeric terpolymers, polymers having glycidyl functionality, polymers having glycidyl acrylate functionality, and polymers having epoxide functionality.

4. A method of treating a petroleum asphalt having an asphaltene content, the method comprising:
   contacting a petroleum asphalt with particles of resin component,
   wherein the resin is polypropylene and the asphaltene content is in the range of about 3 to 5 wt %, and the resin particles have a diameter less than about 590 microns.

5. An asphalt comprising:
   a first component comprising a petroleum asphalt having an asphaltene content; a second component dispersed in the asphalt comprising resin particles; and,
   a third component dispersed in the asphalt selected from the group consisting of ground tire rubber and polymers of styrene and butadiene,
   wherein the resin is polypropylene and the asphaltene content is in the range of about 3 to 5 wt %, and the resin particles have a diameter less than about 590 microns.

6. The asphalt of claim 5, further comprising glycidyl functional terpolymers, and a wax.

7. The asphalt of claim 5, wherein the asphalt when tested according to ASTM D 7173 has a temperature differential of less than or equal to a 10° C. (18° F.) temperature differential using ASTM D 7173.

8. The asphalt of claim 5, wherein the asphalt when tested according to ASTM D 7173 has a temperature differential of less than or equal to a 6° C. (10.8° F.) temperature differential using ASTM D 7173.

9. The asphalt of claim 5, wherein the asphalt when tested according to ASTM D 7173 has a temperature differential of less than or equal to a 4° C. 7.2° F.) temperature differential using ASTM D 7173.

10. The asphalt of claim 5, wherein the asphalt when tested according to ASTM D 7173 has a temperature differential of less than or equal to a 2° C. (3.6° F.) temperature differential using ASTM D 7173.

11. A method of modifying a petroleum asphalt having an asphaltene content, the method comprising:

forming a composition comprising the petroleum asphalt, a first component, a second component, a third component and a fourth component to form a modified asphalt, wherein the first component comprises polypropylene resin particles; the second component comprises wax, and the third component is a glycidyl functional polymer, and the fourth component is selected from the group consisting of ground tire rubber and polymers of styrene and butadiene, wherein the asphaltene content is in the range of about 3 to 5 wt %, and the resin particles have a diameter less than about 590 microns.

12. The method of claim 11, wherein the the resin comprises glycidyl methacrylate functionality.

13. The method of claim 11, wherein the the resin comprises an ethylene-butyl acrylate-glycidyl methacrylate polymer.

14. The method of claim 11, wherein the modified asphalt when tested according to ASTM D 7173 has a temperature differential of less than or equal to a 10° C. (18° F.) temperature differential using ASTM D 7173.

15. The method of claim 11, wherein the modified asphalt when tested according to ASTM D 7173 has a temperature differential of less than or equal to a 6° C. (10.8° F.) temperature differential using ASTM D 7173.

16. The method of claim 11, wherein the modified asphalt when tested according to ASTM D 7173 has a temperature differential of less than or equal to a 4° C. (7.2° F.) temperature differential using ASTM D 7173.

17. The method of claim 11; wherein the modified asphalt when tested according to ASTM D 7173 has a temperature differential of less than or equal to a 2° C. (3.6° F.) temperature differential using ASTM D 7173.

* * * * *